(12) United States Patent
Kitagawa et al.

(10) Patent No.: US 6,420,858 B1
(45) Date of Patent: Jul. 16, 2002

(54) DC-TO-DC CONVERTER CIRCUIT HAVING A POWER SAVING MODE

(75) Inventors: Seiya Kitagawa, Yatsushiro; Toshiyuki Matsuyama, Komaki; Hidekiyo Ozawa, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/466,133

(22) Filed: Dec. 21, 1999

(30) Foreign Application Priority Data

Dec. 25, 1998 (JP) .......................................... 10-369006

(51) Int. Cl.⁷ ................................................. G05F 1/40
(52) U.S. Cl. ...................................................... 323/282
(58) Field of Search ................................ 323/266, 271, 323/273, 275, 282, 285, 299, 303

(56) References Cited

U.S. PATENT DOCUMENTS 5,565,761 A * 10/1996 Hwang ........................ 323/222
5,721,483 A * 2/1998 Kolluri et al. ............... 323/224
5,831,418 A * 11/1998 Kitagawa ..................... 323/222
6,046,896 A * 4/2000 Saeki et al. .................... 361/86

* cited by examiner

Primary Examiner—Matthew Nguyen
(74) Attorney, Agent, or Firm—Staas & Halsey LLP

(57) ABSTRACT

A DC-to-DC converter circuit having a power saving mode, and which achieves a high conversion efficiency without using a sense resistance. The DC-to-DC converter circuit includes a triangular wave generation circuit to generate a triangular wave signal and a differential amplifier to receive the triangular wave signal and to generate an output signal. A main switching element is provided to turn ON and OFF an input voltage, and a synchronous commutating switching element is provided to perform synchronous commutation of a load current. A detection device detects whether an output voltage of the main switching element is larger than an input voltage of the main switching element. A control device operates in a power saving mode to reduce a drive voltage of the main switching element in response to the detection device detecting that the output voltage of the main switching element is larger than the input voltage.

23 Claims, 31 Drawing Sheets

SIMULTANEOUS OFF PERIOD

SIMULTANEOUS OFF PERIOD

DC-TO-DC CONVERTER CIRCUIT HAVING A POWER SAVING MODE

CROSS-REFERENCE TO RELATED APPLICATIONS

This application is based upon and claims priority of Japanese Patent Application No. 10-369006 filed Dec. 25, 1998, the contents being incorporated herein by reference.

BACKGROUND OF THE INVENTION

1. Field of the Invention

The present invention relates to a DC-to-DC converter circuit including a main switching element to perform DC-to-DC conversion by using the main switching element to turn an input voltage on and off. More specifically, the present invention relates to a DC-to-DC converter circuit that achieves a high conversion efficiency without using a sense resistance.

2. Description of the Related Art

Battery-driven devices, such as notebook personal computers (PCs), typically include DC-to-DC converter circuits to convert the voltage of AC adapters, dry-cell batteries and the like into a voltage required by a load. In order to increase the utility of such battery-driven devices, the conversion efficiency of the DC-to-DC converter circuit must be increased.

The conversion efficiency of conventional DC-to-DC converter circuits provided in battery-driven devices, such as notebook PCs, is made as high as possible using a switching regulator to perform pulse width modulation (PWM) control. DC-to-DC converter circuits using the type of switching element that performs PWM control can be either a voltage mode control DC-to-DC converter circuit or a current mode control DC-to-DC converter circuit, depending on the method of control.

FIG. 31 illustrates a conventional voltage mode control DC-to-DC converter circuit. As shown in FIG. 31, the voltage mode control DC-to-DC converter circuit generates a PWM control signal (Vpwm) and comprises a triangular wave generation circuit 2 to generate triangular wave signals, an error amp (AMP) to output a voltage Ver in response to an output voltage Vout, and a comparator (COMP) to compare the triangular wave signals output by the triangular wave generation circuit 2 and an output voltage Ver of the error amp (AMP). The DC-to-DC conversion circuit shown in FIG. 31 performs DC-to-DC conversion by turning a main switching element Q1 on and off via a driver circuit 4.

The conventional voltage mode control DC-to-DC converter circuit shown in FIG. 31 includes a synchronous commutating switching element Q2 in place of a flywheel diode, and a main switching element Q1. The ON/OFF operation of the synchronous commutating switching element Q2 is performed as a reverse operation of the ON/OFF operation of the main switching element Q1. When the main switching element Q1 is off, the synchronous commutating switching element Q2 supplies current to an output capacitor C1 from an inductor L1 with a smaller drop in voltage than with a flywheel diode.

An example of a conventional current mode control DC-to-DC converter circuit is the MAX 786 PWM controller made by the Maxim Co. of the U.S. As shown in FIG. 32, the MAX 786 PWM current mode control DC-to-DC converter circuit comprises a sense resistance R to detect a load voltage; an error amp (AMP 1) to output a voltage in response to an output voltage Vout; a current amp (AMP 2) to receive the voltage sensed by the sense resistance R and to output a voltage that becomes larger as the input voltage generated by sense resistance R becomes larger; a current comparator (COMP 1) to compare the output of the error amp AMP 1 with the output of the current amp AMP 2, and to output a high level when the current amp AMP 2 output voltage reaches an output voltage Ver of the error amp AMP 1; and a flip-flop FF1 to latch a high level in response to a predetermined frequency pulse and to reset the latch output at a low level when the current comparator COMP 1 outputs a high level. A control logic circuit 6 turns the main switching element Q1 on and the synchronous commutating switching element Q2 off when the flip-flop FF1 outputs a high level, and turns the main switching element Q1 off and the synchronous commutating switching element Q2 on when the flip-flop FF1 outputs a low level.

As shown in FIG. 32, a reverse current comparator (COMP 2) receives the voltage output by the sense resistance R, detects the reverse current generated when the load current becomes small (that is, the current flowing from capacitor C1 to inductor L1) and outputs a high level. A flip-flop FF2 latches the high level when the reverse current comparator (COMP 2) outputs a high level, and resets the latch output at a low level in response to the pulse input by the flip-flop FF1. When the flip-flop FF2 indicates the generation of a reverse current, the control logic 6 then cuts off the reverse current by turning synchronous commutating switching element Q2 off in order to prevent wasted consumption of power by the sense resistance R.

Further, a mini-current comparator (COMP 3) receives the output voltage of the current amp AMP 2 as an input, detects when the load current is even smaller than the level generated by the reverse current, and outputs a high level. When the mini-current comparator COMP 3 detects a decrease in the load current, the control logic 6 enters a power saving mode (pulse skip mode). The drive current of the main switching element Q1 (synchronous commutating switching element Q2), which is problematic when the charge current is low, can be reduced by selecting the drive instruction signals of the main switching element Q1 (synchronous commutating switching element Q2) input from the flip-flop FF1.

In operation of the device shown in FIG. 32, when entering the power saving mode, after extra energy is injected into an output LC filter by turning the main switching element Q1 on at the maximum duty on width, the power saving mode is entered by causing the main switching element signal Q1 and the synchronous commutating switching element Q2 to rest.

In the above-described manner, the current mode control DC-to-DC converter circuit shown in FIG. 32 functions to stop the reverse current by turning the synchronous commutating switching element Q2 off when the reverse current is generated in response to the load current becoming smaller, thereby preventing the waste of electric power caused by the reverse current flowing through the sense resistance R.

The current mode control DC-to-DC converter circuit also has the function of reducing the drive current of the main switching element Q1 (synchronous commutating switching element Q2) when the load current becomes small, which becomes problematic when the load current becomes small, by selecting the drive instruction signals of the main switching element Q1 (synchronous commutating switching element Q2).

On the other hand, unlike the current mode control DC-to-DC converter circuit, the voltage mode control DC-to-DC converter circuit shown in FIG. 31 is unable to improve the conversion efficiency because it does not have the ability to measure the load current. Therefore, when a high conversion efficiency is required, the current mode control DC-to-DC converter circuit has been employed.

However, the current mode control DC-to-DC converter circuit shown in FIG. 32 has the problem of wasteful use of energy by the sense resistance since the sense resistance is used to measure the load current.

Recently, the load current in notebook Pcs having DC-to-DC converter circuits has been constantly increasing as functions become more and more advanced, and it is now impossible to ignore the loss of power caused by the sense resistance. For example, when a sense resistance of 22 m$\Omega$ is used, if the load current is 4 A, the power loss caused by the sense resistance is 22 m$\Omega \times 4$ A$^2$=0.352 W. With an output of 3.3 V this becomes a power loss of 2.67%.

Moreover, the sense resistance has the problem of high price because it is a special article with low resistance in the tens of m$\Omega$ and precision below 1%.

In order to solve the above-described problems, technology has been disclosed that uses the "on" resistance of the main switching element Q1 in place of the sense resistance. However, when the "on" resistance of the main switching element Q1 is used as the sense resistance, a different problem occurs because large restrictions on design are imposed as the range of choices for the main switching element Q1 disappears.

SUMMARY OF THE INVENTION

It is an object of the present invention to overcome the above-described problems of the prior art DC-to-DC converter circuits.

It is another object of the present invention to provide a DC-to-DC converter circuit to perform a highly efficient conversion without using a sense resistance.

It is yet another object of the present invention to provide a DC-to-DC converter circuit to perform DC-to-DC conversion by using switching elements to turn an input voltage on and off.

Objects and advantages of the present invention are achieved in accordance with embodiments of the present invention with a DC-to-DC converter circuit comprising: a triangular wave generation circuit to generate a triangular wave signal; a differential amplifier to receive the triangular wave signal and to generate an output signal; a main switching element to turn on and off an input voltage based on an operation control signal generated in response to the triangular wave signal and the output signal of the differential amplifier; a synchronous commutating switching element to perform synchronous commutation of a load current and having an off period simultaneous with that of the main switching element, and which turns on and off in a mode opposite to that of the main switching element; a detection device to detect whether an output voltage of the main switching element is larger than an input voltage of the main switching element; and a control device to operate in a power saving mode to reduce a drive voltage of the main switching element in response to the detection device detecting that the output voltage of the main switching element is larger than the input voltage.

In accordance with embodiments of the present invention, the control device performs control to operate in the power saving mode, which results in a low consumption of energy. Specifically, the control device eliminates the drive of the synchronous commutating switching element by turning the synchronous commutating switching element off. Alternatively, the control device may eliminate the drive of the main switching element and the synchronous commutating switching element by turning the main switching element and the synchronous commutating switching element off; or the control device may reduce the drive frequency of the main switching element and the synchronous commutating switching element by lowering an oscillating frequency of the triangular wave signal; or the control device may reduce the drive frequency of the main switching element and eliminate the drive of the synchronous commutating switching element by lowering the oscillating frequency of the triangular wave signal and by turning the synchronous commutating switching element off.

In accordance with embodiments of the present invention, the DC-to-DC converter further comprises an output filter including an inductor. The current flowing to the inductor of the output filter becomes lower than 0 A (enters a reverse current state) when the load current is small, and thus the current flows into the inductor. If this phenomenon occurs when the synchronous commutating switching element is on (a condition permitting reverse current), and the main switching element and the synchronous commutating switching element are then turned off, the current that flowed into the inductor flows back toward the input voltage via a parasitic diode of the main switching element, thus causing the output voltage of the main switching element to an become larger than the input voltage. In other words, when the load current becomes small, the phenomenon occurs that the output voltage of the main switching element becomes larger than the input voltage.

The detection device detects whether the load current has become small by detecting whether or not the output voltage of the main switching element has become larger than the input voltage. In response to the detection device detecting that the load current has become small, the control device performs control to operate the DC-to-DC converter circuit in the power saving mode, which results in a low consumption of power.

In accordance with embodiments of the present invention, the DC-to-DC converter circuit detects when the load current has become small without the use of a sense resistance. In response to detecting that the load current has become small, the power saving mode is entered, which lowers the drive frequency of the switching elements. Thus, the low power consumption that is desirable when the load current becomes small is achieved without the use of sense resistance. Further, by eliminating the sense resistance to reduce the consumption of power, a highly efficient conversion is achieved, as well as cost reduction.

In accordance with embodiments of the present invention, when a power saving mode in which the main switching element and synchronous commutating switching element are turned OFF is used, the DC-to-DC converter circuit cancels the power saving mode when the lowering of the output voltage becomes excessive by providing, since turning the main switching element off lowers the output voltage, 1) a detection device to detect whether or not the output voltage has become smaller than a predetermined value and 2) a cancellation device to cancel the power saving mode in response to the detection device detecting a lowering of output voltage. Alternatively, in accordance with the present invention, the DC-to-DC converter circuit cancels the power saving mode when the lowering of the output voltage is excessive by providing, since the output voltage of the differential amplifier varies in a predetermined direction in response to the lowering of the output voltage, 1) a detection device to detect whether or not the output voltage of the differential amplifier has varied such that it has reached a predetermined value, and 2) a cancellation device to cancel the power saving mode in response to detection device detecting that the output voltage of the differential amplifier has varied.

Further, in accordance with the present invention, when a power saving mode is used in which the main switching element is turned on and off while the synchronous commutating switching element is turned off, the power saving mode is cancelled when the load current becomes large by providing, since the output voltage of the differential amplifier is modified in a predetermined direction as a result of the inductor current becoming non-continuous when the load current is small, 1) a detection device to detect whether or not the output voltage of the differential amplifier has changed to reach a predetermined value, and 2) a cancellation device to cancel the power saving mode in response to the detection device detecting a change of the output voltage of the differential amplifier.

Further, in accordance with the present invention, when a power saving mode is used in which the main switching element is continuously turned on and off, the power saving mode is cancelled when the load current becomes large by providing, since the peak value of the inductor current becomes large when the load current becomes large, 1) a detection device to detect whether or not the peak value of the current that flows to the inductor which is part of the output filter has become larger than a predetermined value by using the on resistance, or the like, of the main switching element, and 2) a cancellation device to cancel the power saving mode in response to the detection device detecting a rise in the peak value of the inductor current.

In accordance with the present invention, when a power saving mode is used in which the main switching element and the synchronous commutating switching element are turned off, it is preferable to provide a cancellation control device to control such that the main switching element is the first to be turned ON in response to the cancellation device cancelling the power saving mode, so that the energy stored in a capacitor which is part of the output filter does not dissipate.

Further, in accordance with the present invention, when a power saving mode is used in which the main switching element and the synchronous commutating switching element are turned off, an injection device injects energy into the capacitor which is part of the output filter in response to the cancellation device canceling the power saving mode, since the energy stored in the capacitor which is part of the output filter is low.

The injection device injects energy into the capacitor which is part of the output filter by making the on width time prescribed by the operation control signal larger than usual (for example, the ON width time can be modified in correspondence with the input voltage), or by keeping the main switching element on.

Furthermore, a stop device to stop the energy injection processing executed by the injection device is provided. The stop device stops the energy injection processing by causing the energy injection to stop when the output voltage has become larger than a predetermined value, since the output voltage rises as a result of the energy injection processing. Alternatively, the stop device stops the energy injection processing by causing the energy injection to stop when the output voltage of the differential amplifier has changed such that it has reached a predetermined value (it can be modified in correspondence with the input voltage), since the output voltage of the differential amplifier is modified in a predetermined direction in response to a rise in the output voltage. Alternatively, the stop device can stop the energy injection processing by using the on resistance of the main switching element, or the like, to detect a peak value of the current flowing to the main switching element, and causing the energy injection processing to stop when the peak value is larger than a predetermined value.

When stopping the energy injection processing, the stop device stops the energy injection processing by turning only the main switching element off. Alternatively, the stop device may stop the energy injection processing by turning the main switching element and the synchronous commutating switching element off.

In accordance with embodiments of the present invention, the DC-to-DC converter circuit detects when the load current has become small without the use of sense resistance. When it is detected that the load current has become small, the power saving mode is entered, which lowers the drive frequency of the switching elements. Thus, the low power consumption, which is desirable when the load current becomes small, is achieved without the use of sense resistance. Thus, by reducing the consumption of power by a sense resistance, a highly efficient conversion is achieved, as well as cost reduction.

In accordance with embodiments of the present invention, the conditions for canceling the power saving mode of the DC-to-DC converter circuit can be accurately detected.

In accordance with embodiments of the present invention, when the power saving mode of the DC-to-DC converter circuit is cancelled, energy, which had decreased as a result of entering the power saving mode, is injected in a short span of time into the output filter. Furthermore, in accordance with the present invention, the conditions for stopping the injection of energy can be accurately detected.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
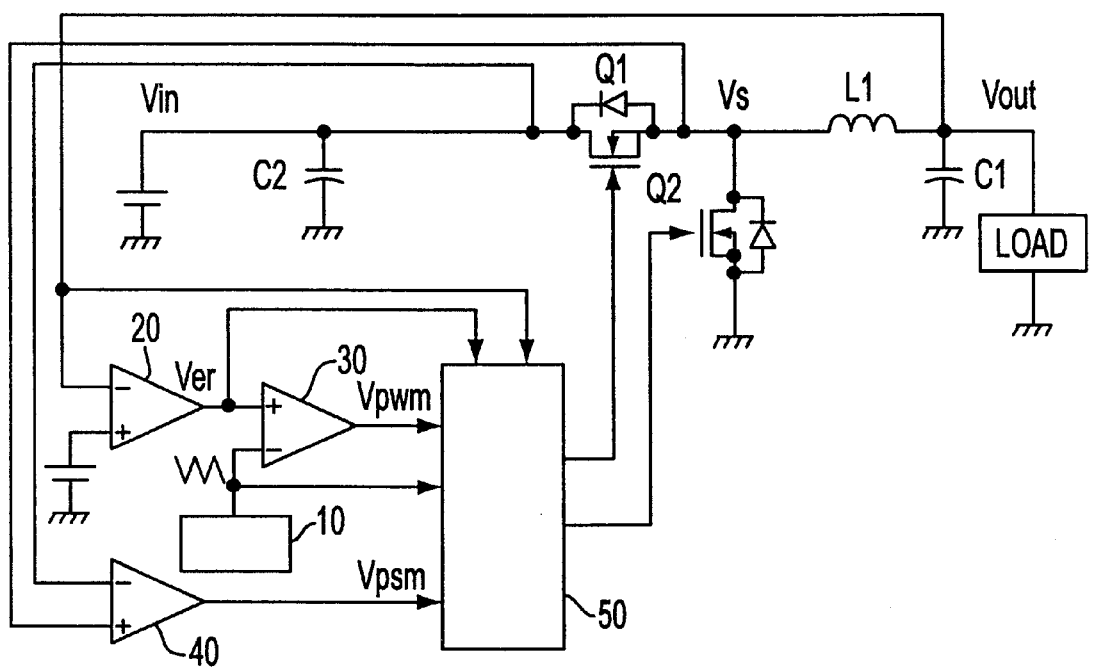
FIG. 1 is a block diagram of a DC-to-DC converter circuit in accordance with a first embodiment of the present invention.

Reference will now be made in detail to the preferred embodiments of the present invention, examples of which are illustrated in the accompanying drawings, wherein like reference numerals refer to like elements throughout.

Figure 2:
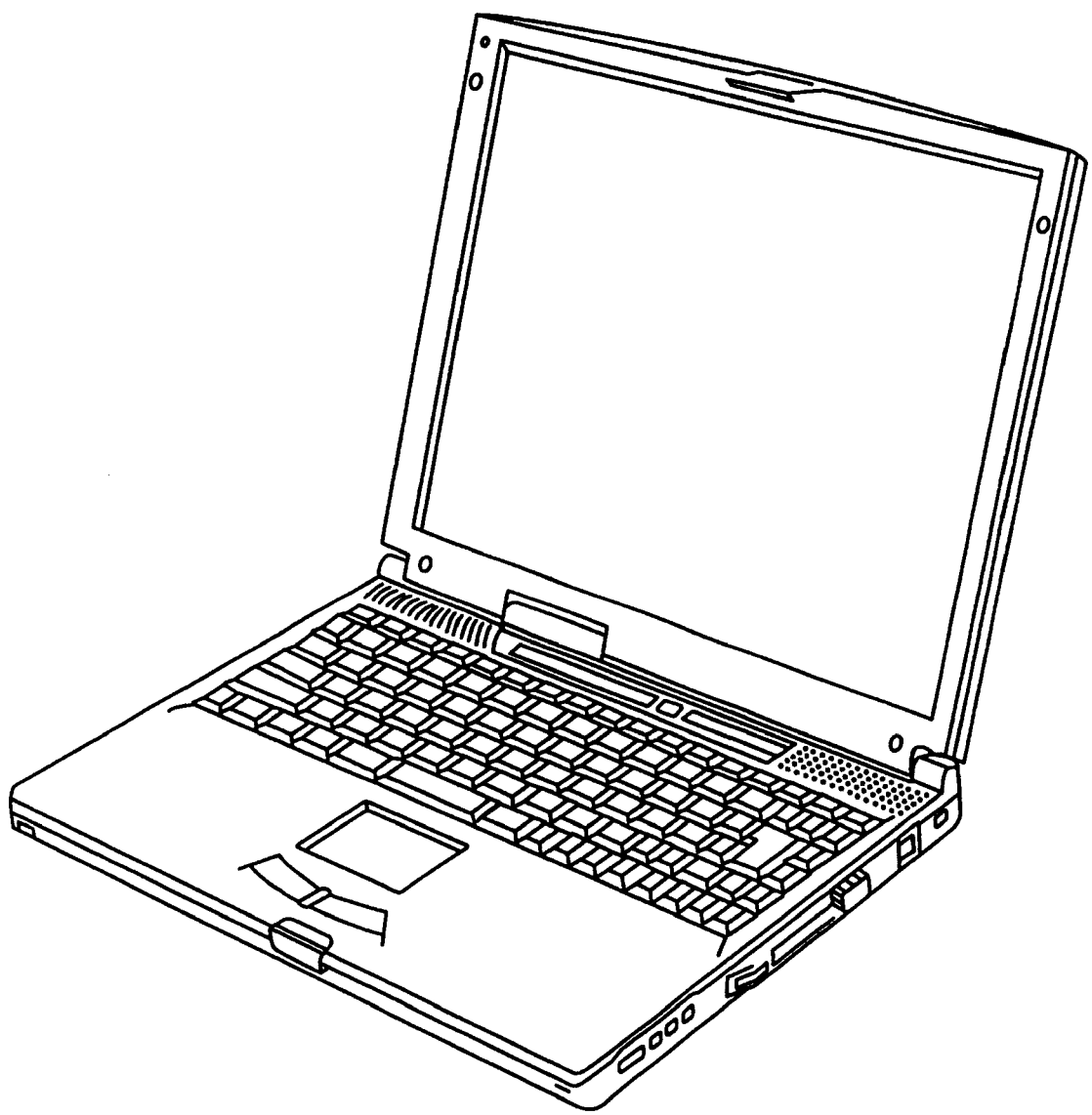
FIG. 2 is a diagram of a notebook personal computer having a DC-to-DC converter circuit in accordance with embodiments of the present invention.

FIG. 1 is a block diagram of a DC-to-DC converter circuit in accordance with a first embodiment of the present invention. The DC-to-DC converter circuit shown in FIG. 1 is a voltage mode control DC-to-DC converter circuit that does not have a sense resistance. As shown in FIG. 2, the DC-to-DC converter circuit in accordance with the present invention is preferably used in notebook PCs and the like.

As shown in FIG. 1, the DC-to-DC converter circuit performs DC-to-DC conversion by controlling the ON/OFF operations of a main switching element Q1 and a synchronous commutating switching element Q2. The respective switching elements Q1, Q2 preferably comprise N-channel MOSFETs. The DC-to-DC converter circuit comprises an output filter including an inductor L1 and a capacitor C2.

The DC-to-DC converter circuit shown in FIG. 1 in accordance with the first embodiment of the present invention improves the conversion efficiency of a current mode control DC-to-DC converter circuit, while conforming to the voltage mode control DC-to-DC converter circuit. As shown in FIG. 1, the DC-to-DC converter circuit comprises a triangular wave generation circuit to generate triangular wave signals; an error amp 20 to generate and output a voltage Ver corresponding to the output voltage Vout of the DC-to-DC converter circuit; a PWM comparator 30 to compare the triangular wave signal of the triangular wave generation circuit 10 with the output voltage Ver of the error amp 20, to output a PWM control signal (Vpwm), and to output a high level when the output Ver of the error amp 20 is larger than the triangular wave signal; a power saving mode (PSM) set comparator 40 to output a PSM instruction signal (Vpsm) having a high level when the source voltage (Vs) of the main switching element Q1 is larger than the drain voltage (Vin); and a control logic circuit 50 which receives as inputs the output voltage Vout of the DC-to-DC converter circuit, the output voltage Ver of the error amp 20, the PWM control signal (Vpwm), the triangular wave signal, and the PSM instruction signal (Vpsm), and outputs signals to control the ON/OFF operations of the main switching element Q1 and the synchronous commutating switching element Q2.

Figure 3A:
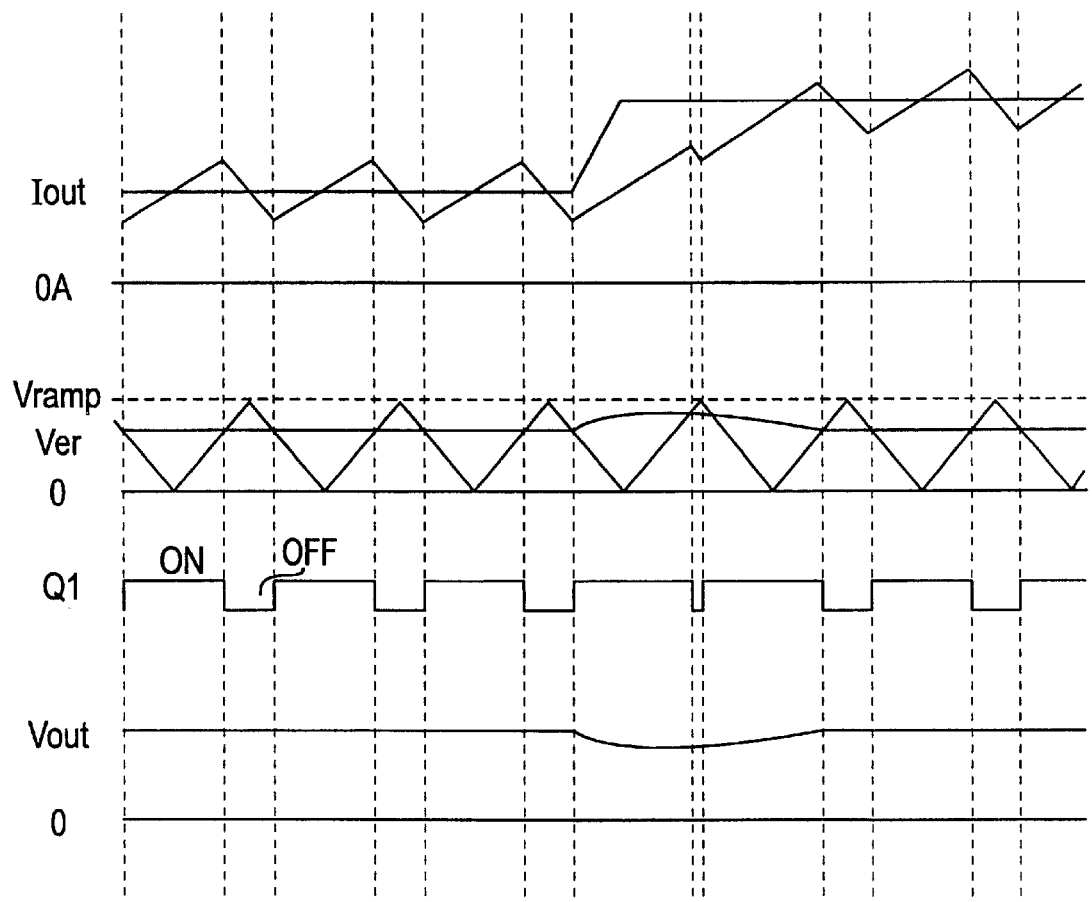
FIGS. 3A and 3B are graphs illustrating the operation of the DC-to-DC converter circuit in accordance with the first embodiment of the present invention.
Figure 3B:
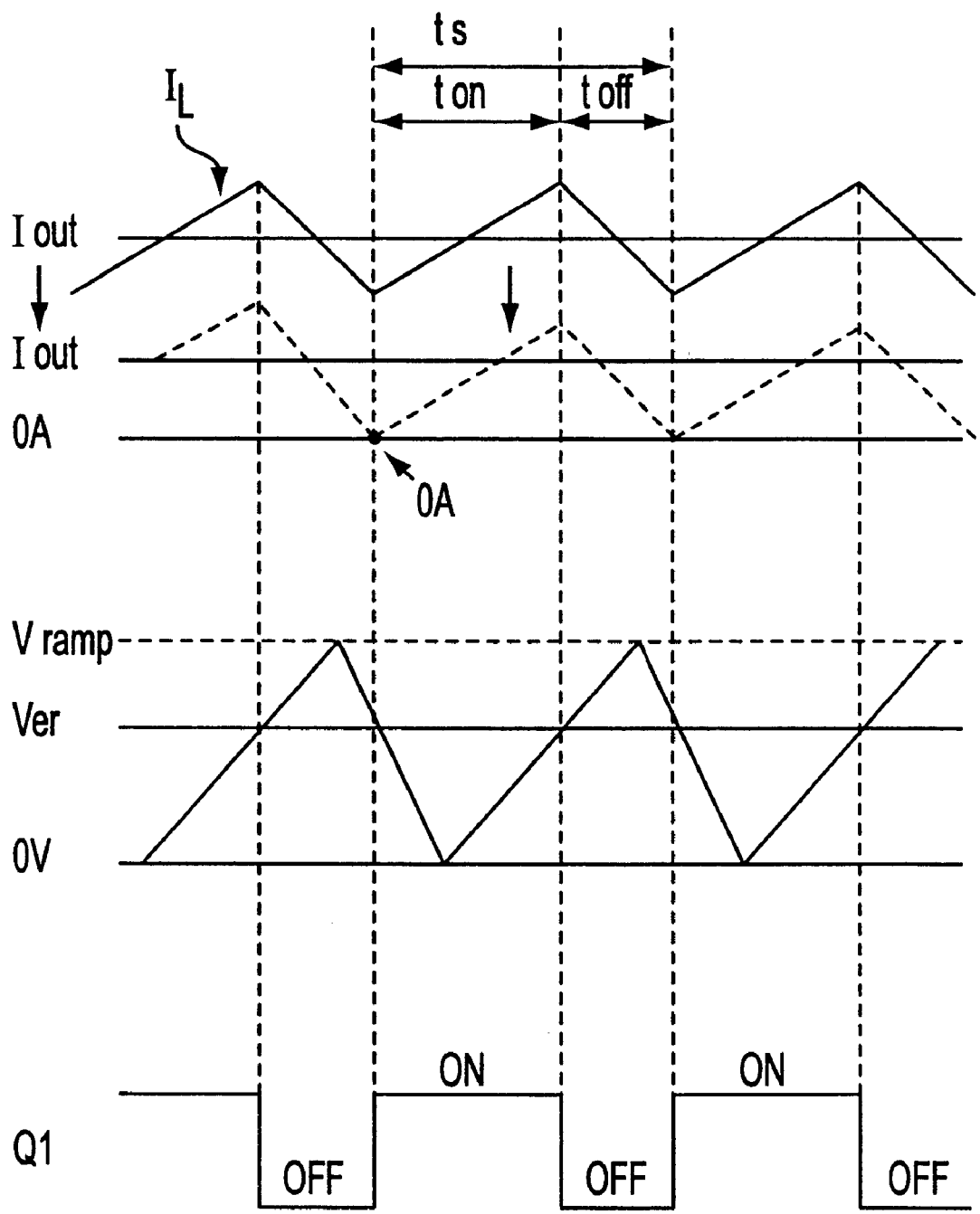

FIGS. 3A and 3B are graphs illustrating the operation of the DC-to-DC converter circuit in accordance with the first embodiment of the present invention. As shown in FIGS. 3A and 3B, Iout is the load current, Vramp is the triangular wave amplitude voltage, Ver is the output voltage of the error amp 20, and Q1 is the ON/OFF switching of the main switching element Q1. The input voltage Vin, the output voltage Vout, the output voltage Ver of the error amp 20, the ON time t on of the main switching element Q1, the triangular wave oscillation cycle ts, and the triangular wave amplitude voltage Vramp have the following relation:

t on/ts=Vout/Vin, t on/ts=Ver/Vramp.

Thus, the output voltage Ver of the error amp 20 is Ver=Vramp×Vout/Vin.

In order to raise the output voltage Vout when the output voltage Vout is low, the ON time t on of the main switching element Q1 is increased. Therefore, as shown in FIG. 3A, in accordance with the first embodiment of the present invention, when the output voltage Vout becomes low, the output voltage Ver of the error amp 20 moves in a rising direction.

Further, if both the main switching element Q1 and the synchronous commutating switching element Q2 are turned ON at the same time, the input voltage Vin will short-circuit to ground. Therefore, the control logic circuit 50 establishes a period of time during which both the main switching element Q1 and the synchronous commutating switching element Q2 are OFF together.

Figure 4A:
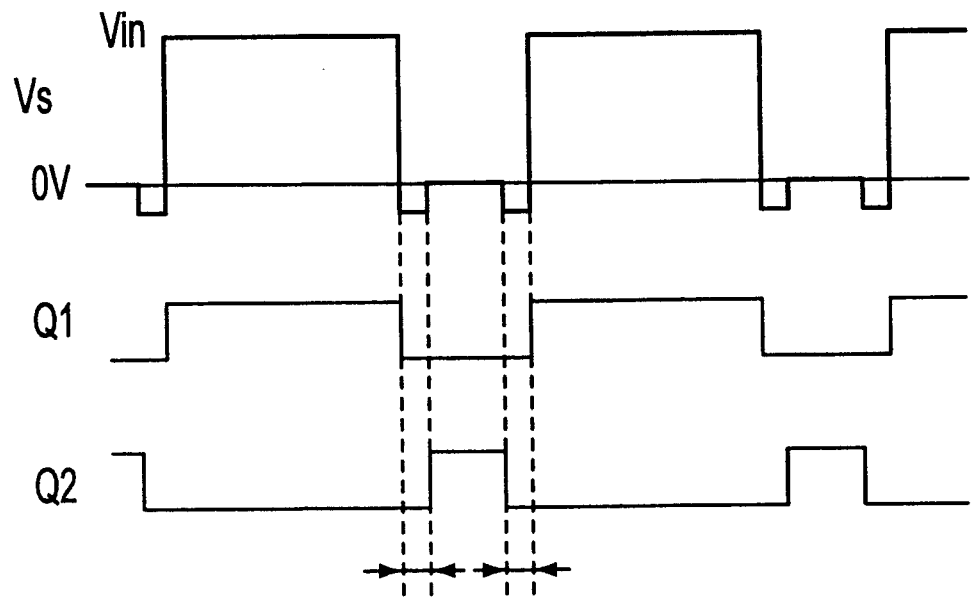
FIGS. 4A and 4B are graphs illustrating operation of the main switching element Q1 and the synchronous commutating switching element Q2 in accordance with the first embodiment of the present invention.
Figure 4B:
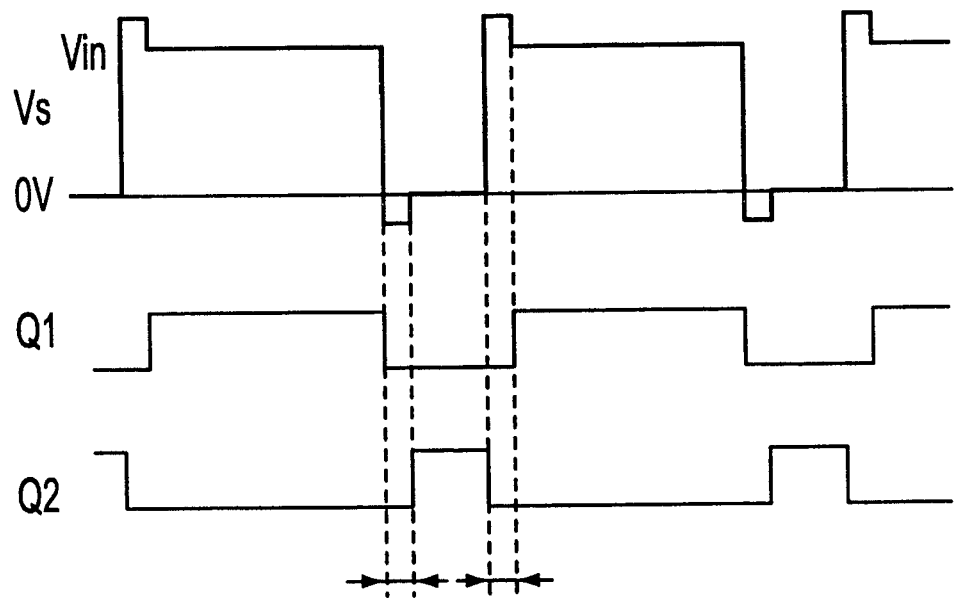

FIGS. 4A and 4B are graphs illustrating the source voltage Vs of the main switching element Q1 in relation to the ON/OFF switching of the respective transistors Q1, Q2 by the control logic circuit 50 in accordance with the first embodiment of the present invention.

As shown in FIG. 4A, the control logic circuit 50 controls the ON/OFF switching of the switching elements Q1, Q2 in the following manner. When the main switching element Q1 is turned OFF, the control logic circuit 50 does not immediately turn the synchronous commutating switching element Q2 ON, but rather, keeps the synchronous commutating switching element Q2 OFF for a short time after the main switching element Q1 has been turned OFF. Further, when the synchronous commutating switching element Q2 is turned OFF, the control logic circuit 50 does not immediately turn the main switching element Q1 on, but continues to keep the main switching element Q1 it OFF for a short time after the synchronous commutating switching element Q2 has been turned OFF.

In accordance with the first embodiment of the present invention, the voltage mode control DC-to-DC converter circuit does not have a sense resistance, and the DC-to-DC converter circuit in accordance with the first embodiment of the present invention comprises the power saving mode (PSM) set comparator 40 to detect that the load current has become small.

As shown in FIG. 3B, when the load current Iout becomes small, the inductor L1 current $I_L$, which increases and decreases in proportion to the load current Iout, becomes lower than 0 A. Specifically the inductor L1 current becomes lower than 0 A under the following conditions:

I out<(Vin−Vout)×Vout×ts/(2×L×Vin), where ts is the triangular wave oscillation cycle, and L is the inductor L1 value.

As described above, the control logic circuit 50 provides a period of time during which both the main switching element Q1 and the synchronous commutating switching element Q2 are OFF. When the synchronous commutating switching element Q2 is ON, the inductor current becomes lower than 0 A. After this, when both the main switching element Q1 and the synchronous commutating switching element Q2 are OFF, a reverse current flows and the inductor current that flowed into the inductor L1 flows backward into the input voltage Vin via a parasitic diode of the main switching element Q1. When the reverse current occurs, the inductor L1 and main switching element Q1 become, in effect, a booster circuit.

FIG. 4B is a graph of the source voltage Vs of the main switching element Q1 in relation to the ON/OFF states of the main switching element Q1 and the synchronous commutating switching element Q2 in accordance with the first embodiment of the present invention. As shown in FIG. 4B, the source voltage Vs of the main switching element Q1 becomes higher than the drain voltage (input voltage Vin) when the reverse current occurs.

The PSM set comparator 40 detects whether the condition illustrated in FIG. 4B has occurred by detecting whether or not the source voltage Vs of the main switching element Q1 has become larger than the drain voltage Vin. When the PSM set comparator 40 detects that the condition in FIG. 4B has occurred, it is determined that the load current Iout has become small and the PSM set comparator 40 instructs the control logic circuit 50 to enter a power saving mode (PSM).

In the above-described manner, the DC-to-DC converter circuit in accordance with the first embodiment of the present invention provides a voltage mode control DC-to-DC converter circuit that does not have a sense resistance, and has the function of detecting when the load current Iout has become small.

When the PSM set comparator 40 provides an instruction to the control logic 50 to enter the power saving mode, the DC-to-DC converter circuit in accordance with the present invention, like conventional current mode control DC-to-DC converter circuits, operates with the aim of improving conversion efficiency by entering the power saving mode. In the power saving mode, the respective drive frequencies of the main switching element Q1 and the synchronous commutating switching element Q2 are reduced.

Figure 5:
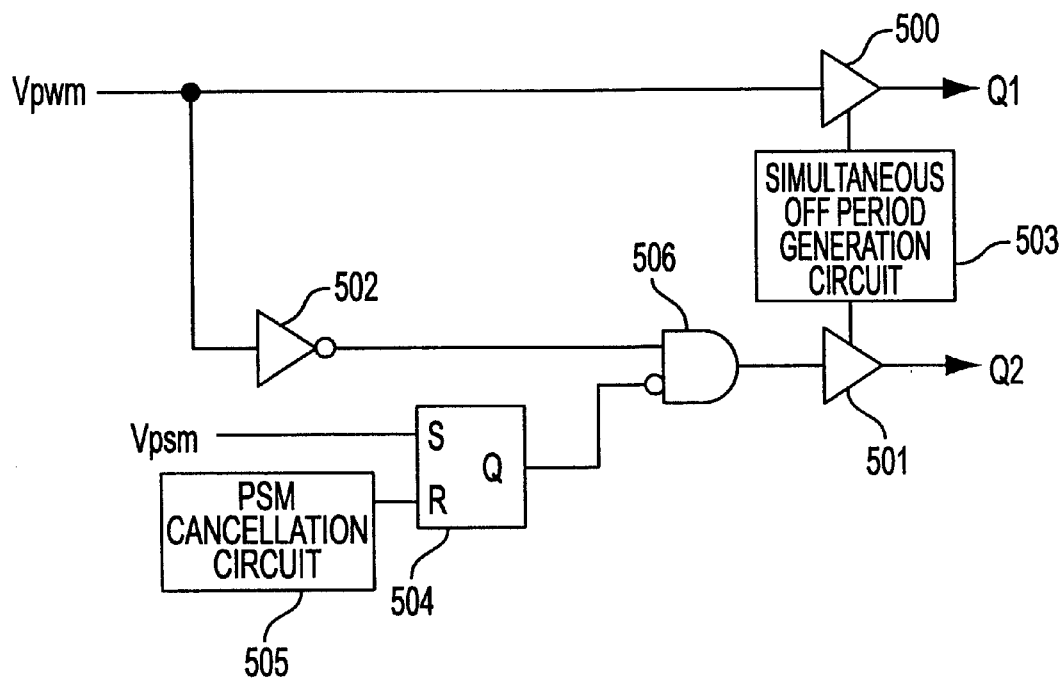
FIG. 5 is a diagram of a control logic circuit to achieve a power saving mode in accordance with the first embodiment of the present invention.
Figure 6:
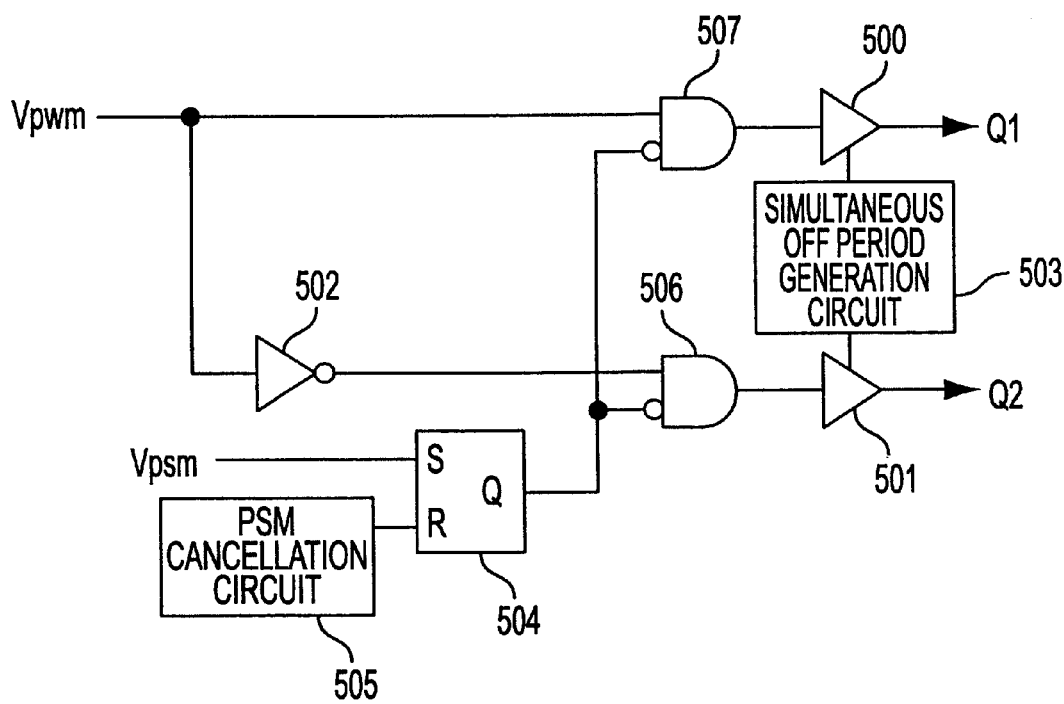
FIG. 6 is a diagram of a control logic circuit to achieve a power saving mode in accordance with the first embodiment of the present invention.

FIGS. 5 and 6 respectively illustrate circuit diagrams of the control logic circuit 50 for achieving the power saving mode (PSM) in accordance with the first embodiment of the present invention.

In accordance with the embodiment of the invention shown in FIG. 5, the control logic circuit 50 comprises a first drive circuit 500 to turn the main switching element Q1 ON and OFF in response to the PWM control signal (Vpwm) output by the PWM comparator 30; a second drive circuit 501 to turn the synchronous commutating switching element Q2 ON and OFF in response to the PWM control signal (Vpwm) output by the PWM comparator 30; an inverter circuit 502 to invert the PWM control signal output by the PWM comparator 30; a simultaneous OFF period generation circuit 503 to generate the simultaneous off period for the main switching element Q1 and the synchronous commutating switching element Q2, as described above with respect to FIG. 4; a PSM latch circuit 504 to latch a high level in response to the PSM instruction signal (Vpsm) output by the PSM set comparator 40; a PSM cancellation circuit 505 to issue reset instructions to the PSM latch circuit 504; an AND circuit 506 to calculate the logical product of the output signal of the inverter circuit 502 and the inverse value of the output signal of the PSM latch circuit 504, and to output the logical product to the second drive circuit 501.

The simultaneous OFF period generation circuit 503 is a conventional circuit, and therefore it is illustrated in block diagram form FIG. 5.

In operation of the control logic circuit 50 shown in FIG. 5, when the PWM control signal (Vpwm) is at a high level, the main switching element Q1 is turned ON and the synchronous commutating switching element Q2 is turned OFF. When the PWM control signal (Vpwm) is at a low level, the main switching element Q1 is turned OFF and, the synchronous commutating switching element Q2 is turned ON. The PSM latch circuit 504 latches a high level when the PSM set comparator 40 provides an instruction to enter the power saving mode. In response to the instruction to enter the power saving mode, the ON operation of the synchronous commutating switching element Q2 is stopped by the AND circuit 506 entering the cut-off operation.

In the above-described manner, the control logic circuit 50 shown in FIG. 5 operates to lower the consumption of power and to improve conversion efficiency by entering a power saving mode that stops the drive of the synchronous commutating switching element Q2 when the PSM set comparator 40 generates the instruction to enter the power saving mode.

The control logic circuit 50 shown in FIG. 6 includes the same elements as shown in FIG. 5, and also includes an AND circuit 507 to calculate the logical product of the PWM control signal (Vpwm) output by the PWM comparator 30 and the inverse value of the output signal of the PSM latch circuit 504. The control logic circuit 50 shown in FIG. 6 performs control such that the first drive circuit 500 turns the main switching element Q1 ON and OFF in response to the output signal of the AND circuit 507.

In operation of the control logic circuit shown in FIG. 6, when the PWM control signal (Vpwm) is at a high level, the main switching element Q1 is turned ON and the synchronous commutating switching element Q2 is turned OFF. When the PWM control signal (Vpwm) is at a low level, the main switching element Q1 is turned OFF and, with the synchronous commutating switching element Q2 being ON, the PSM latch circuit 504 latches a high level when the PSM set comparator 40 generates an instruction (Vpsm) to enter the power saving mode. In response to the instruction (Vpsm) to enter the power saving mode, the "on" operation of the synchronous commutating switching element Q2 is stopped by the AND circuit 506 and the AND circuit 507 entering the cut-off operation.

In the above-described manner, the control logic circuit 50 shown in FIG. 6 operates to lower the consumption of power and to improve conversion efficiency by entering a power saving mode that stops the drive of the main switching element Q1 and the synchronous commutating switching element Q2 when the PSM set comparator 40 generates the instruction to enter the power saving mode.

Figure 7:
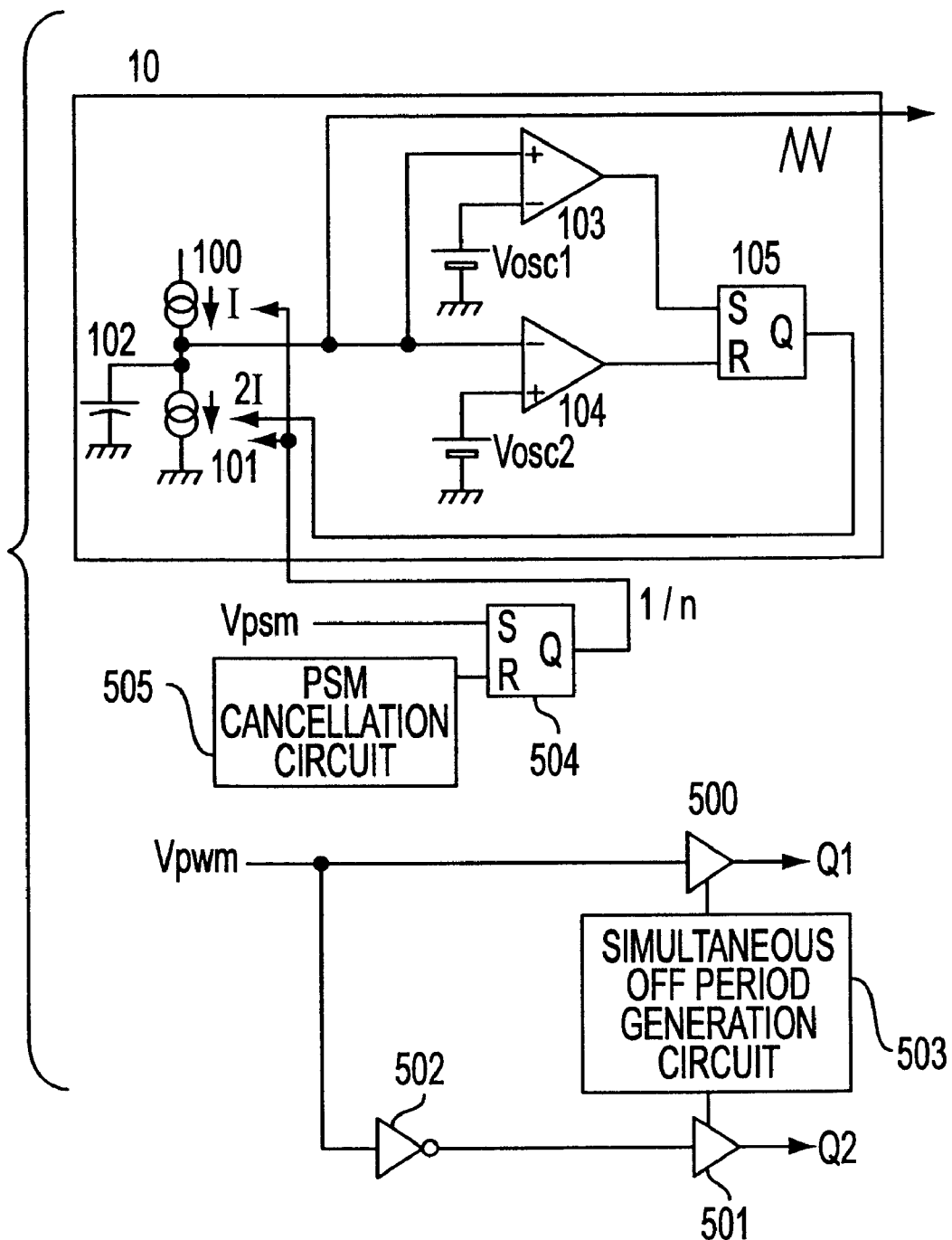
FIG. 7 is a circuit diagram of a control logic circuit and a triangular wave generation circuit for a power saving mode in accordance with embodiments of the present invention.

FIG. 7 is a circuit diagram of a control logic circuit and triangular wave generation circuit 10 for achieving the power saving mode in accordance with the first embodiment of the present invention. In the embodiment illustrated in FIG. 7, the control logic circuit 50 comprises the above-described first drive circuit 500, the second drive circuit 501, the inverter circuit 502, the simultaneous OFF period generation circuit 503, the PSM latch circuit 504, and the PSM cancellation circuit 505.

As shown in FIG. 7, the triangular wave generation circuit 10 comprises a first constant current source 100 to generate a constant current I$\mu$A when the PSM latch circuit 504 outputs a low level and to generate a constant current (I/n) $\mu$A (where n is an integer greater than or equal to 2) when the PSM latch circuit 504 outputs a high level; a second constant current source 101, which is serially connected to the first constant current source 100, to generate a constant current of 2 I$\mu$A when the PSM latch circuit 504 outputs a low level and to generate a constant current of (2I/n) $\mu$A when the PSM latch circuit 504 outputs a high level; a capacitor 102 which charges as a result of the constant current output by the first constant current source 100 and which discharges as a result of the constant current output by the second constant current source 101; a comparator circuit 103 to output a high level when the discharge voltage of the capacitor 102 becomes larger than a reference value Vosc1; a comparator circuit 104 to output a high level when the charged voltage of the capacitor 102 becomes smaller than a reference value Vosc2; and a flip-flop circuit 105 to activate the second constant current source 101 by latching a high level when the comparator circuit 103 outputs a high level, and to stop the second constant current source 101 by resetting the latch output at a low level when the comparator circuit 104 outputs a high level.

As shown in FIG. 7, the triangular wave generation circuit 10 generates a triangular wave signal with a predetermined oscillating frequency by repeating the following operations. When the second constant current source 101 has not been activated, the capacitor 102 is charged with the constant current generated by the first constant current source 100 and, when the charged voltage of the capacitor 102 rises to the reference value Vosc1, the second constant current source 101 is started via the flip-flop circuit 105. When the second constant current source 101 has been activated, the capacitor 102 is charged with the constant generated by the second constant current source 101 and, when the charged voltage of the capacitor 102 decreases to the reference value Vosc2, the second constant current source 101 is stopped via the flip-flop circuit 105.

When, at this time, the PSM set comparator 40 generates the instruction to enter the power saving mode, the latch circuit 504 latches a high level. In response to the latch circuit 504 latching a high level, the triangular wave generation circuit 10 lowers the constant current generated by the first and second constant current sources 100 and 101 by "1/n" times, thus lowering the triangular wave signal oscillation frequency by "1/n" times. If V is the gate drive voltage, Qg is the gate charge load, and f is the oscillation frequency of the triangular waves generated by the triangular wave generation circuit 10, then the drive power Pd of the main switching element Q1 and the synchronous commutating switching element Q2 is defined as:

$$Pd = V \times Qg \times f / 2.$$

As the above equation demonstrates, as the oscillation frequency f decreases, the conversion efficiency can be improved.

In accordance with the embodiment of the invention illustrated in FIG. 7, when the PSM set comparator 40 provides an instruction (Vpsm) to enter the power saving mode, the triangular. wave generation circuit 10 operates to increase conversion efficiency by entering a power saving mode that lowers the oscillation frequency of the triangular waves generated by the triangular wave generation circuit 10.

Figure 8:
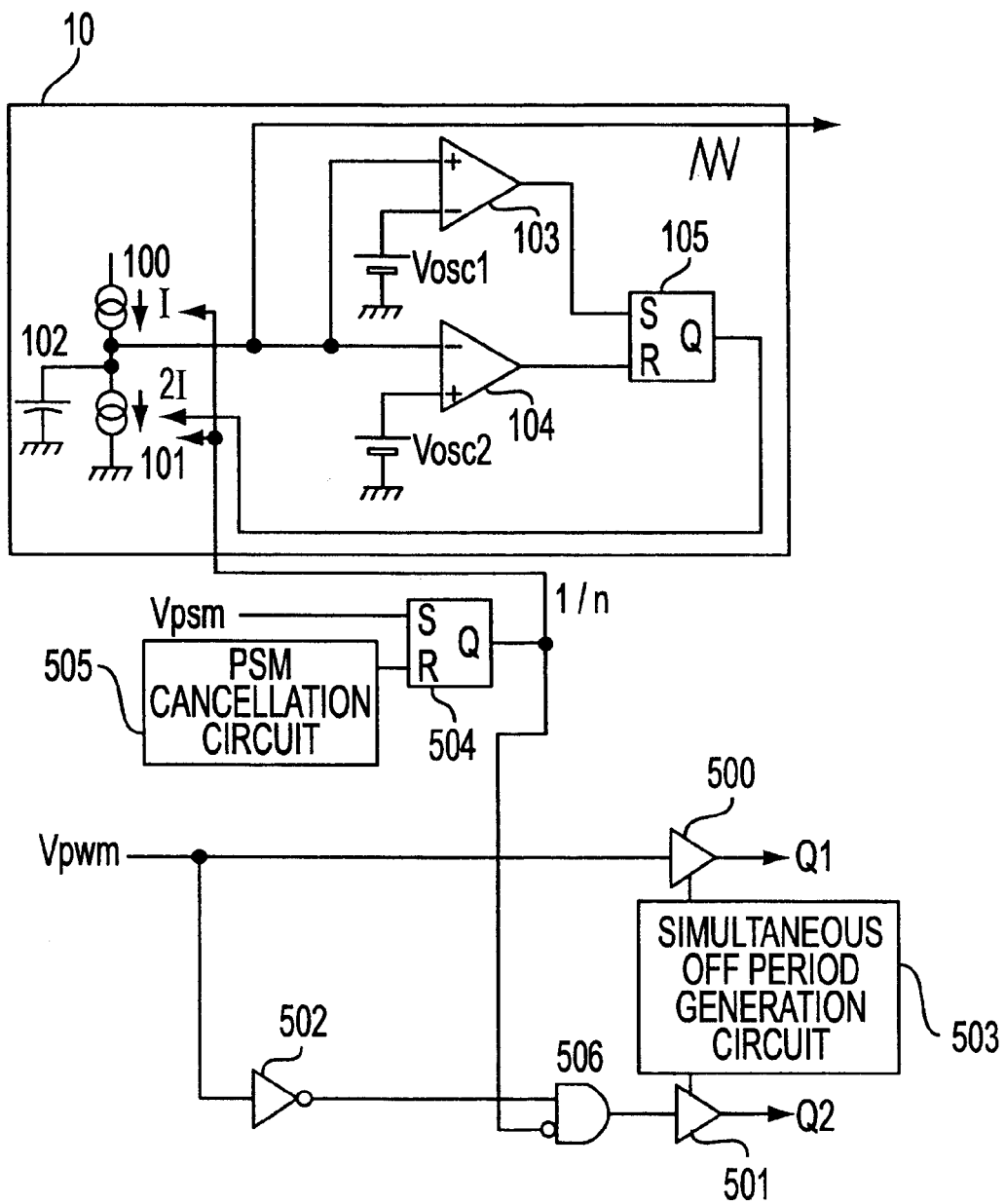
FIG. 8 is a circuit diagram of a control logic circuit and a triangular wave generating circuit for a power saving mode in accordance with embodiments of the present invention.

FIG. 8 is a circuit diagram of a control logic circuit and a triangular wave generation circuit 10 in accordance with another embodiment of the present invention. The embodiment illustrated in FIG. 8 combines the triangular wave generation circuit 10 shown in FIG. 7 with the control logic circuit illustrated in FIG. 5, resulting in a triangular wave generation circuit that stops the drive of the synchronous commutating switching element Q2 during the power saving mode. In accordance with the embodiment shown in FIG. 8, the drive power of the synchronous commutating switching element Q2 is eliminated, thus further improving the conversion efficiency.

The PSM cancellation circuit 505 shown in FIGS. 5 through 8 will now be described in detail below. The PSM cancellation circuit 505 cancels the power saving mode established by the PSM set comparator 40 by issuing reset instructions to the PSM latch circuit 504. In the embodiment illustrated in FIG. 6, a power saving mode which turns the main switching element Q1 OFF is employed. In this case, when the power saving mode is entered, the output voltage Vout of the DC-to-DC converter circuit is lowered, and the output voltage Ver of the error amp 20, which increases the ON width of the PWM control signal, rises along with the lowering of the output voltage Vout. Thus, by detecting the fall of the output voltage Vout and the rise of the output voltage Ver of the error amp 20, instructions are generated to cancel the power saving mode.

Figure 9:
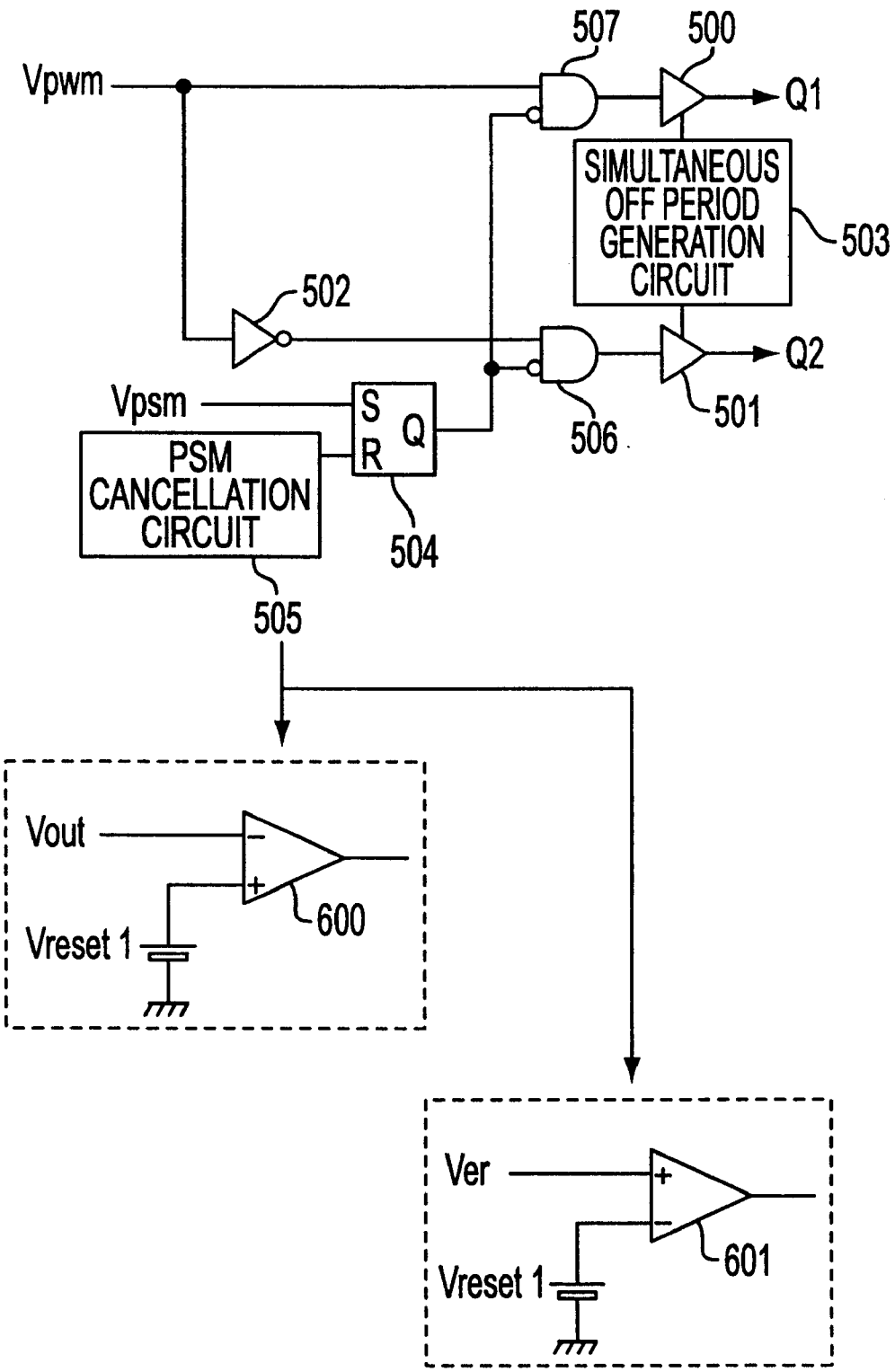
FIG. 9 is a circuit diagram of a power saving mode cancellation circuit in accordance with embodiments of the present invention.

FIG. 9 is a circuit diagram of the power saving mode (PSM) cancellation circuit 505 in accordance with embodiments of the present invention. The PSM cancellation circuit 505 shown in FIG. 9 is incorporated into the embodiment shown in FIG. 6 and comprises a PSM reset comparator 600 to reset the PSM latch circuit 504. The PSM reset comparator 600 inputs the output voltage Vout at a negative terminal and inputs a reference voltage Vreset1 at a positive terminal, and outputs a high level when the output voltage Vout is lower than the reference voltage Vreset1. Alternatively, the PSM cancellation circuit 505 may comprise a PSM reset comparator 601 to reset the PSM latch circuit 504 by inputting the output voltage Ver of the error amp 20 at the positive terminal and inputting the reference voltage Vreset1 at the negative terminal, and outputting a high level in response to the PSM reset comparator 601 determining that the output voltage Ver of the error amp 20 is higher than the reference voltage Vreset1.

In accordance with the embodiment of the present invention shown in FIG. 9, when the output voltage Vout decreases, the output voltage Ver of the error amp 20 increases. Thus, when the PSM cancellation circuit 505 comprises the PSM reset comparator 601, if the reference voltage Vreset1 is set at a selected voltage at or above "Vramp×Vout/Vin," the PSM latch circuit 504 will be reset when Vout decreases.

$$\Delta Vout=(Vreset1-Vref)/gain,$$

where Vref is the error amp 20 reference voltage and gain is the error amp 20 voltage gain.

In accordance with the embodiment of the invention illustrated in FIG. 6, the main switching element Q1 and the synchronous commutating switching element Q2 are turned OFF simultaneously when the power saving mode is entered. In this case, when the power saving mode is to be cancelled, first, the synchronous commutating switching element Q2 is turned ON. Thereupon, the output capacitor C1 is discharged, and the output voltage Vout falls even further. When the undesired result of the output voltage Vout falling further occurs, a reverse current condition occurs, thus causing another undesired result, specifically, the proceeding to the power saving mode.

Figure 10:
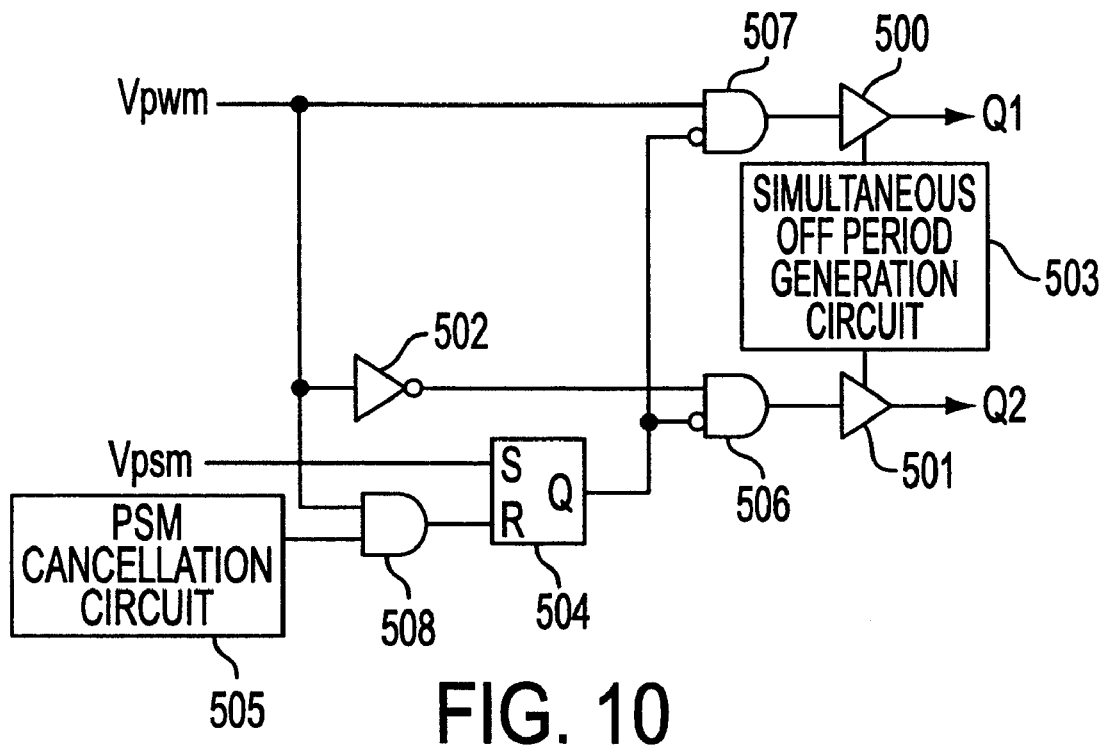
FIG. 10 is a circuit diagram of a power saving mode cancellation circuit in accordance with embodiments of the present invention.

FIG. 10 is a circuit diagram of a power saving mode cancellation circuit in accordance with embodiments of the present invention. In order to stop from proceeding to the power saving mode at this point, instead of resetting the PSM latch circuit 504 using the output signal of the PSM cancellation circuit 505, the power saving mode circuit may comprise an AND circuit 508 to calculate the logical product of the PWM control signal (Vpwm) and the output signal of the PSM cancellation circuit 505, as shown in FIG. 10.

Figure 11:
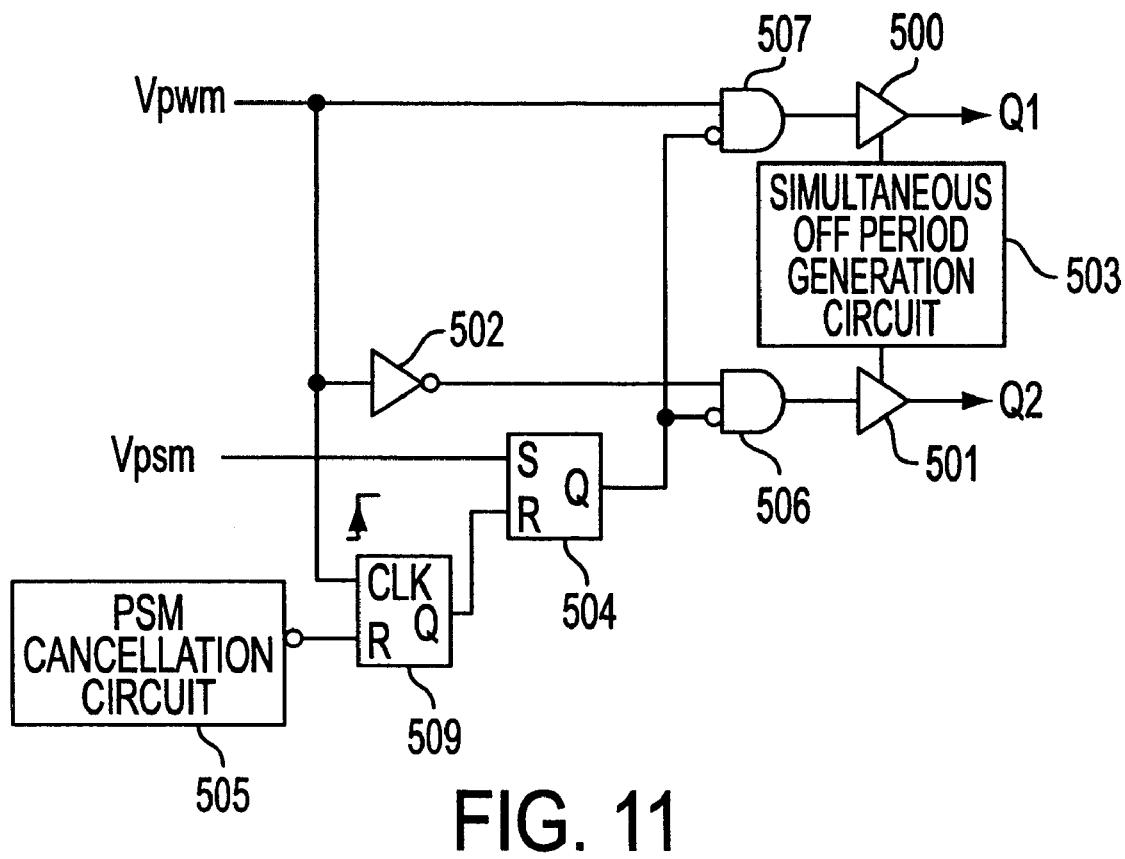
FIG. 11 is a circuit diagram of a power saving mode cancellation circuit in accordance with embodiments of the present invention.

Alternatively, as shown in FIG. 11, the power saving mode circuit may comprise a latch circuit 509 to latch a high level at the start-up of the PWM control signal (Vpwm), and to reset the latch output at a low level in correspondence with the inverse value of the output signal of the PSM cancellation circuit 505 (when the PSM cancellation circuit 505 indicates PSM cancellation, latching becomes possible). In accordance with the present invention, it is preferable to reset the PSM latch circuit 504 using the output signal of the latch circuit 509 (FIG. 11).

In accordance with the embodiment of the invention shown in FIG. 11, it is assured that the main switching element Q1 is the first to be turned ON when the PWM control signal is at a high level, i.e., when cancellation of the power saving mode starts by the PSM latch circuit 504 being reset under the condition that the ON instruction for the main switching element Q1 has been issued.

The embodiments of the invention illustrated in FIGS. 5 and 8 utilize a power saving mode that turns the synchronous commutating switching element Q2 OFF while turning the main switching element Q1 ON and OFF. In this case, because the decrease in the load current causes the inductor L1 current to fall below 0 A, the inductor current becomes discontinuous. At this time, when the inductor current is discontinuous, the output voltage Ver of the error amp 20 becomes lower compared to when the inductor L1 current is continuous. Therefore, in accordance with the present invention, it can be determined that the load current has increased by detecting a rise in the output voltage Ver of the error amp 20, and instructions can be issued to cancel the power saving mode. However, when the synchronous commutating switching element Q2 is turned ON and OFF, the inductor L1 current will not become discontinuous, and thus this construction cannot be used.

Figure 12:
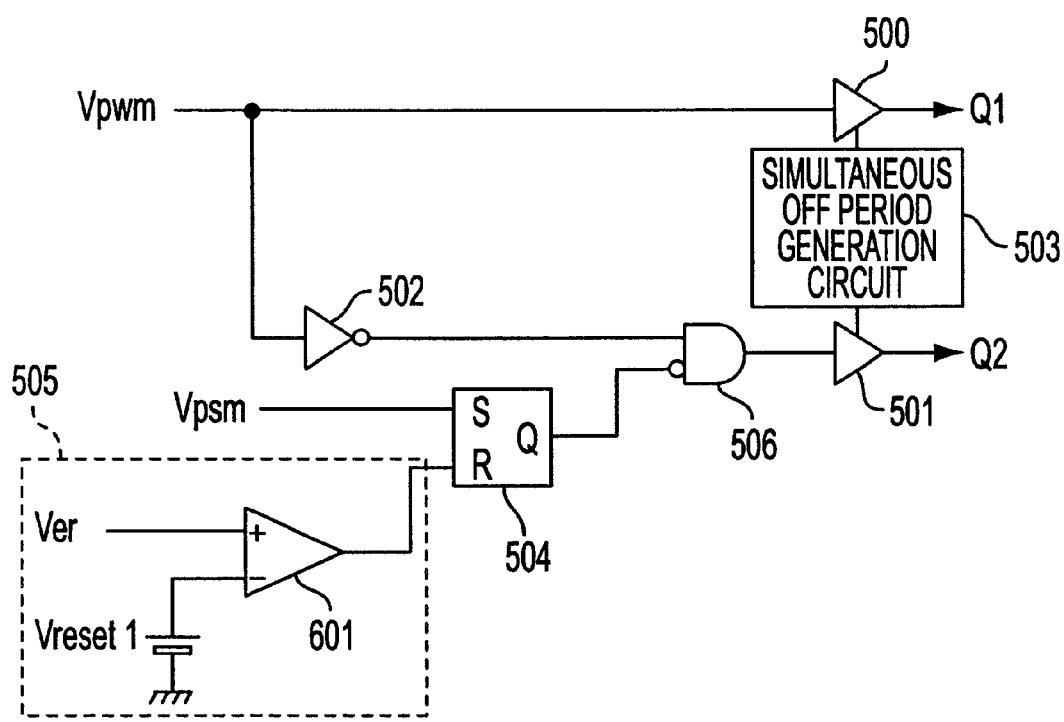
FIG. 12 is a circuit diagram of a power saving mode cancellation circuit in accordance with embodiments of the present invention.

Therefore, in accordance with the embodiment of the invention illustrated in FIG. 5, the PSM cancellation circuit 505 provides, the PSM reset comparator 601 shown in FIG. 12 to reset the PSM latch circuit 504. The PSM reset comparator 601 resets the PSM latch circuit 504 by inputting the output voltage Ver of the error amp 20 at the positive terminal and inputting the reference voltage Vreset1 at the negative terminal and outputting a high level when the output voltage Ver of the error amp 20 rises above the reference voltage Vreset1.

As shown in FIGS. 3A and 3B, when the inductor L1 current is continuous (i.e., when the inductor current is at or above 0 A), the output voltage Ver of the error amp 20 becomes:

$$Ver=Vramp\times Vout/Vin.$$

However, when the inductor current is non-continuous, i.e., when a reverse current condition occurs, the output voltage Ver of the error amp 20 becomes:

$$Ver=(Vramp\times Vout/Vin)\times 2Iout\div((1-Vout/Vin)Vout\times 2Iout\times ts/L)^{1/2},$$

wherein Vramp is a triangular wave amplification voltage, ts is a triangular wave oscillation frequency, and L is an inductor L1 value. Thus, the output voltage Ver of the error amp 20 is lower when the inductor current is non-continuous compared to when the inductor current is continuous.

Figure 13:
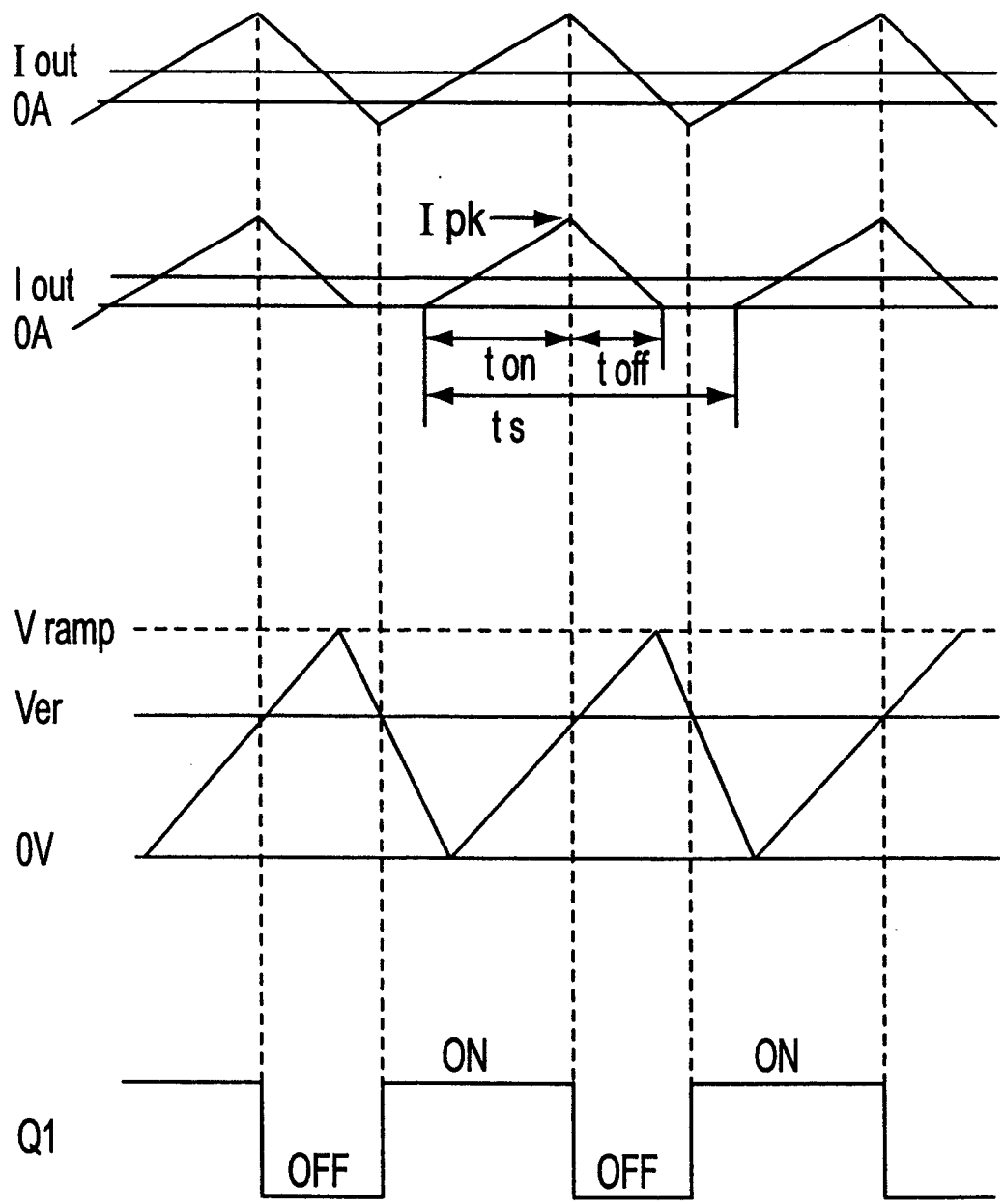
FIG. 13 is a graph illustrating the ON/OFF switching of the main switching element Q1, the triangular wave and the inductor current for explaining operation of the DC-to-DC conversion circuit in accordance with embodiments of the present invention.

FIGS. 13A–13C are graphs illustrating operation of the DC-to-DC converter circuit in accordance with embodiments of the present invention. As shown in FIG. 13, if t on, t off and Ipk for output voltage Ver are defined, they can be calculated from the following relational expressions:

$$t\ on/(t\ on+t\ off)=Vout/Vin$$

$$Ipk=(Vin-Vout)\times t\ on/L$$

(t on+t off)×Ipk/ts=Iout

Ver/Vramp=Ion/ts

In accordance with the embodiment illustrated in FIG. 5, instructions to cancel the power saving mode can be generated based on the above relational expressions by detecting the rise in the output voltage Ver of the error amp 20. More specifically, instructions can be generated since the output voltage Ver of the error amp 20 rises when the inductor current is restored to a continuous state from a non-continuous state by the increase in the load current during the power saving mode.

The embodiments shown in FIGS. 5, 7 and 8 operate in a power saving mode that turns the main switching element Q1 ON and OFF. In this case, the instructions to cancel the power saving mode can be generated in response to detecting an increase in the peak value of the inductor current in response to an increase in the load current.

In the embodiment illustrated in FIG. 7, the peak current ILpeak of the inductor L1 and the load current Iout are related by the following equation:

$$ILpeak = Iout + ts \times (Vin - Vout) \times Vout/(2L \times Vin)$$

wherein ts is the oscillation cycle.

As the above equation shows, although the peak current ILpeak becomes larger as the load current Iout becomes larger, the peak current ILpeak also becomes larger as the oscillation frequency becomes lower (as the oscillation cycle ts becomes larger). In other words, because the duty cycle does not change, the ON time becomes longer as the oscillation cycle ts gets larger, and, in response to this, the peak current ILpeak also becomes larger.

In light of this, the ILpeak used for the power saving mode cancellation instructions is set such that:

$$ILpeak = 2\,Iout$$
$$= ts(pwm) \times (Vin - Vout) \times Vout/(L \times Vin),$$

wherein ts(pwm) is the oscillation cycle of the PWM control signal. Thus, in accordance with embodiments of the present invention, an increase in the inductor L1 peak current ILpeak is detected, which increases as a result of the load current Iout becoming larger. The power saving mode cancellation instructions then are generated in response to the increase in the inductor L1 peak current ILpeak.

However, during the power saving mode the apparent peak current ILpeak becomes larger when the oscillation frequency becomes low. Therefore, it is preferable to set the peak current IL peak used in the power saving mode cancellation instructions such that:

$$ILpeak = 2\,Iout$$
$$= ts(psm) \times (Vin - Vout) \times Vout/(L \times Vin)$$

wherein ts(psm) is the oscillation cycle during power saving mode.

Figure 14:
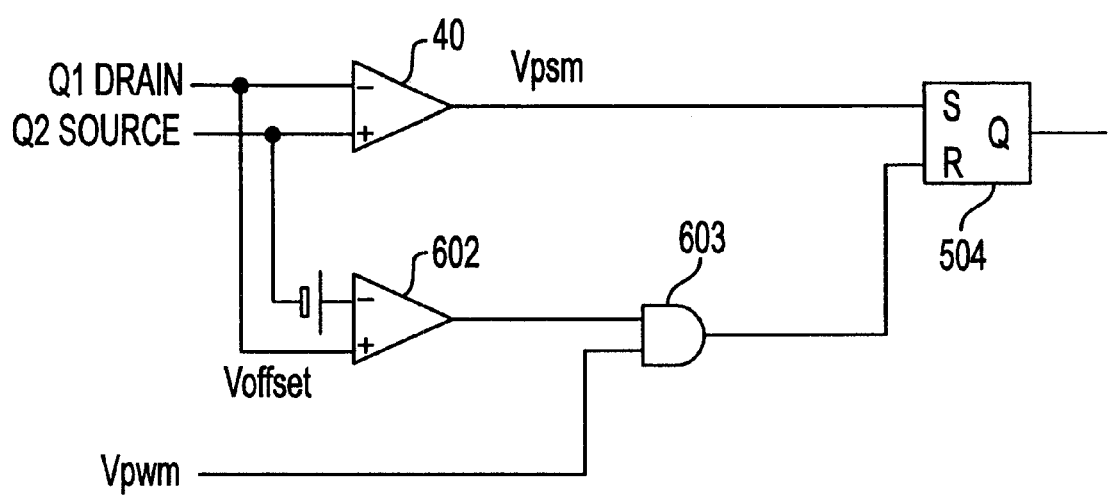
FIG. 14 is a circuit diagram of a power saving mode cancellation circuit in accordance with embodiments of the present invention.

FIG. 14 is a circuit diagram of a PSM cancellation circuit 505 to generate instructions for the cancellation of the power saving mode by detecting the peak value of the inductor current in accordance with embodiments of the present invention.

In accordance with the embodiment of the invention shown in FIG. 14, the peak value of the inductor current is detected using an on resistance Ron of the main switching element Q1. When the main switching element Q1 is turned ON, a voltage between the drain and source of the main switching element Q1 is monitored. The voltage is generated by a current flowing to the main switching element Q1 equal to the inductor current (ILpeak×Ron). As shown in FIG. 14, the PSM cancellation circuit 505 comprises a limited comparator 602 to cancel the power saving mode by resetting the PSM latch circuit 504 when the voltage between the drain and the source of the main switching element Q1 surpasses the reference voltage Voffset.

When the main switching element Q1 is OFF, the source voltage of the main switching element Q1 will become 0 V, and thus the limited comparator 602 will output a high level under any condition. Therefore, the PSM cancellation circuit shown in FIG. 14 includes an AND circuit 603 to cut OFF the output signal of the comparator 602 with the PWM control signal (Vpwm), thereby avoiding this undesirable result.

As described hereinabove, in accordance with the embodiment of the invention illustrated in FIG. 6, the power saving mode operates to turn the main switching element Q1 OFF. Further, the power saving mode is cancelled by detecting a fall in the output voltage Vout and a rise in the output voltage Ver of the error amp 20.

Figure 15:
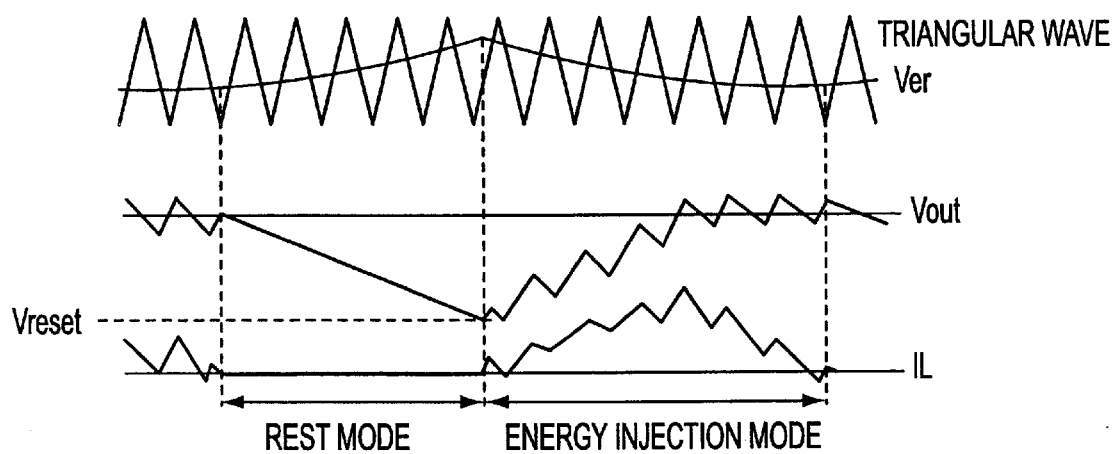
FIG. 15 is a graph explaining operation of the DC-to-DC conversion circuit in accordance with embodiments of the present invention.

FIG. 15 is a graph illustrating operation of the DC-to-DC converter circuit in accordance with embodiments of the present invention. As shown in FIG. 15, when the power saving mode is cancelled in response to detecting the fall in the output voltage Vout and rise in the output voltage Ver of the error amp 20, energy is input into the output capacitor C1 and the output voltage Vout increases by turning the main switching element Q1 ON and OFF. The output voltage Ver of the error amp 20, which rose in response to the fall in the output voltage Vout, then starts to fall to a normal value of "Vramp×Vout/Vin."

At this time, it is preferable to decrease the energy injection time to the output capacitor C1 by performing the energy injection during an ON width time larger than the ON width time of the main switching element Q2 set by the PWM control signal (Vpwm).

Figure 16:
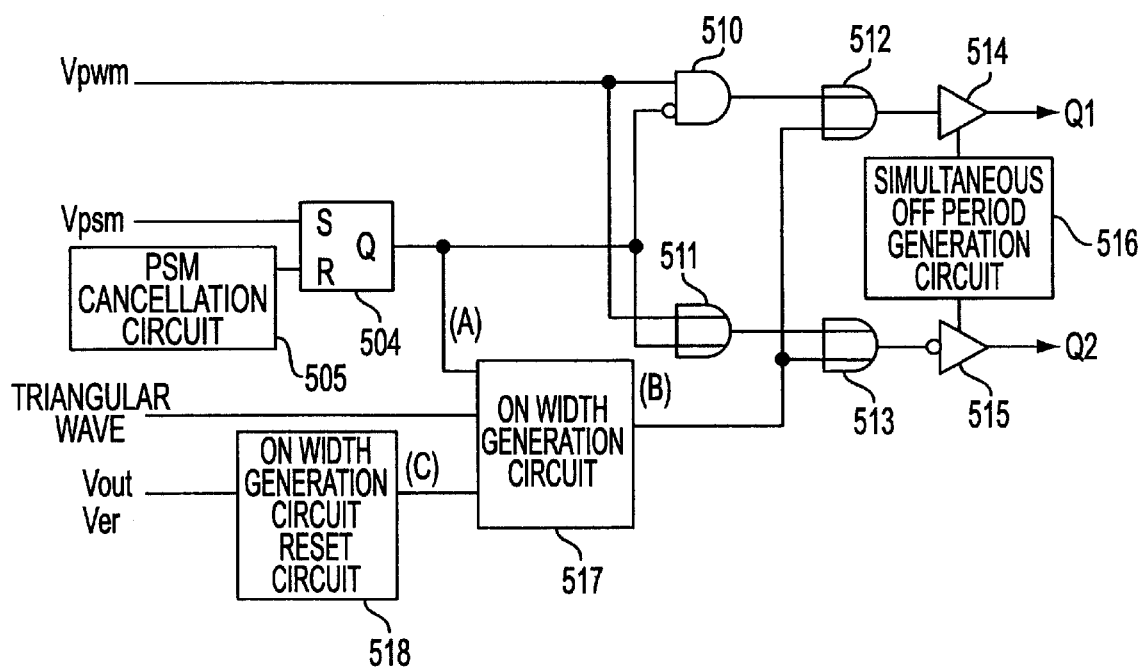
FIG. 16 is a diagram of a circuit for shortening the energy injection time in accordance with embodiments of the present invention.

FIG. 16 is a diagram of a circuit for decreasing the energy injection time used with the embodiment illustrated in FIG. 6 in accordance with embodiments of the present invention.

As shown in FIG. 16, the control logic circuit 50 comprises the PSM latch circuit 504 and the PSM cancellation circuit 505 described above; an AND circuit 510 to calculate and output the logical product of the inverse value of the output signal of the PSM latch circuit 504 and the PWM control signal (Vpwm); an OR circuit 511 to calculate and output the logical sum of the output signal of the PSM latch circuit 504 and the PWM control signal (Vpwm); an OR circuit 512 to calculate and output the logical sum of the output signal of the AND circuit 510 and output signal of an ON width generation circuit 517, which will be described in detail below; an OR circuit 513 to calculate the logical sum of the output signal of the OR circuit 511 and the output signal of the ON width generation circuit 517; a first drive circuit 514 (equivalent to the first drive circuit 500 described above) to turn the main switching element Q1 ON and OFF in response to the output signal of the OR circuit 512; a second drive circuit 515 (equivalent to the second drive circuit 501 described above) to turn the synchronous commutating switching element Q2 ON and OFF in response to the output signal of the OR circuit 513; a simultaneous OFF period generation circuit 516 (equivalent to the simultaneous OFF period generation circuit 503 described above) to generate a simultaneous OFF period for the first and second drive circuits 514 and 515; an ON width generation circuit 517 to generate a control signal equivalent to the PWM control signal having an on width time larger than the PWM control signal when the triangular wave signal generated by the triangular wave generation circuit 10 is the input and the PSM latch circuit 504 generates an instruction to cancel the power saving mode; and an ON width generation circuit reset circuit 518 which issues reset instructions to the ON width generation circuit 517.

In operation of the circuit shown in FIG. 16, when the power saving mode is not entered, the first drive circuit 514 turns the main switching element Q1 ON and the second drive circuit 515 turns the synchronous commutating switching element Q2 OFF; the first drive circuit 514 turns the main switching element Q1 OFF and the second drive circuit 515 turns the synchronous commutating switching element Q2 ON when the PWM control signal (Vpwm) is at a low level. Then, when the power saving mode is entered, the first drive circuit 514 turns the main switching element Q1 OFF when the PSM latch circuit 504 latches a high level, and the second drive circuit 515 turns the synchronous commutating switching element Q2 OFF. In the above-described manner, the embodiment shown in FIG. 16 operates similar to the embodiment illustrated in FIG. 6.

During the operation of the circuit shown in FIG. 16, when the power saving mode is cancelled, the ON width generation circuit 517 generates a control signal equivalent to the PWM control signal (Vpwm), and having an ON width time larger than the PWM control signal during the time before it is reset by the ON width generation reset circuit 518. In response to the control signal generated by the ON width generation circuit, the first drive circuit 514 performs energy injection into the output capacitor C1 by using an ON width time larger than the ON width time prescribed by the PWM control signal (Vpwm) to turn ON the main switching element Q1.

Figure 17:
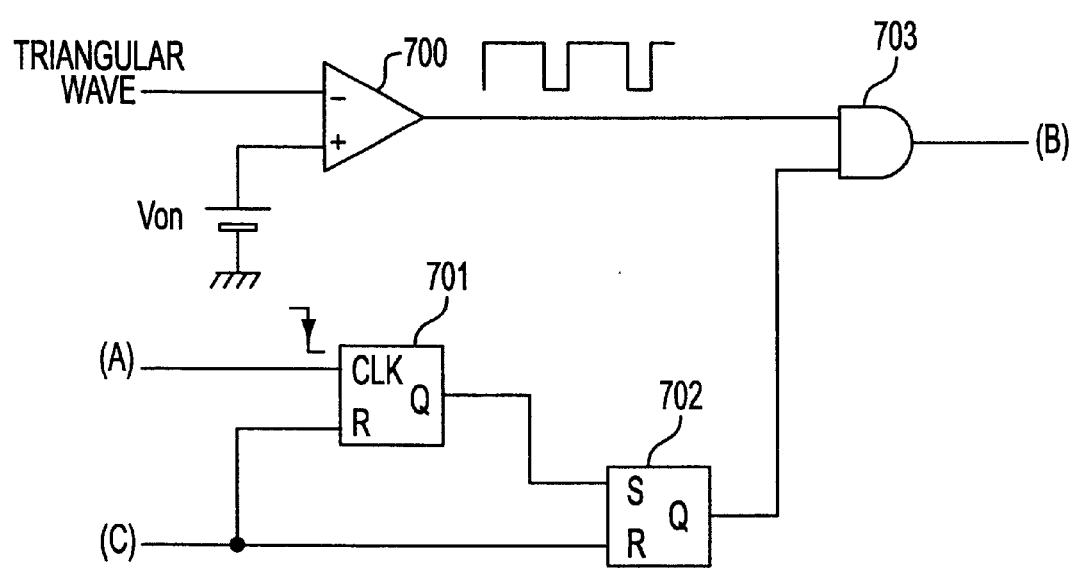
FIG. 17 is a diagram of an ON width generation circuit in accordance with embodiments of the present invention.

FIG. 17 is a circuit diagram of the ON width generation circuit 517 to inject energy into the output capacitor C1 in accordance with embodiments of the present invention.

As shown in FIG. 17, the ON width generation circuit 517 comprises a comparator circuit 700 to generate a control signal equivalent to the PWM control signal (Vpwm) and having a longer ON width time than the PWM control signal. A reference voltage Von is input to the positive input terminal of the comparator circuit 700. The reference voltage Von is set at a value larger than the output voltage Ver of the error amp 20. The triangular wave signal generated by the triangular wave generation circuit 10 is input to the negative input terminal of the comparator circuit 700. The ON width generation circuit 517 further comprises a latch circuit 701 to latch a high level when the PSM latch circuit 504 generates an instruction to cancel the power saving mode, and to reset the latch output in response to the reset instructions from the ON width generation circuit reset circuit 518; a latch circuit 702 to latch a high level when the latch circuit 701 outputs a high level, and to reset the latch output in response to the reset instructions from the ON width generation circuit reset circuit 518; and an AND circuit 703 to calculate and output the logical product of the output signal of the comparator circuit 700 and the output signal of the latch circuit 702. When the power saving mode is cancelled, a control signal equivalent to the PWM control signal and having an ON width time greater than the PWM control signal is generated and output during the time before reset by the ON width generation circuit reset circuit 518.

Figure 18:
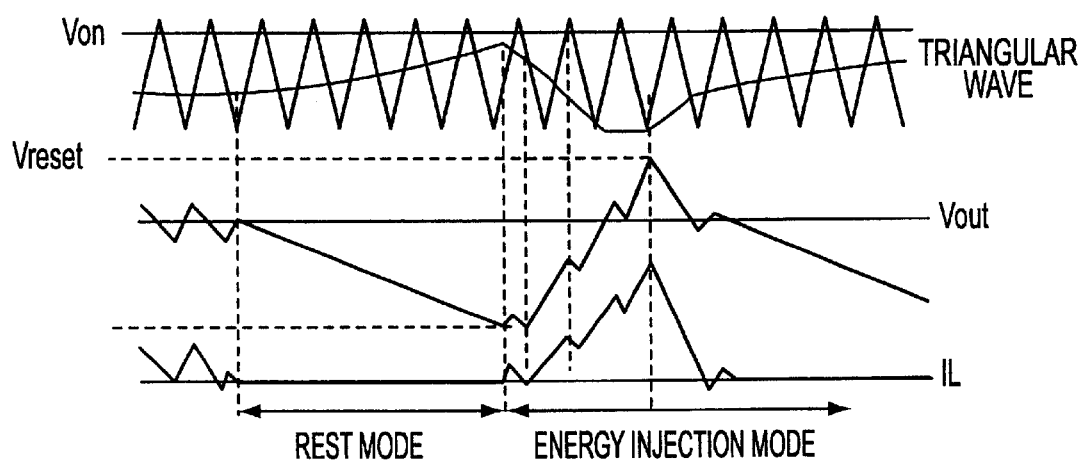
FIG. 18 is a graph for explaining operation of the ON width generation circuit shown in FIG. 17 in accordance with embodiments of the present invention.

FIG. 18 is a graph illustrating operation of the ON width generation circuit 517 in accordance with embodiments of the present invention. As shown in FIG. 18, when the power saving mode is cancelled, energy is injected into the capacitor C1 in a short period of time as main switching element Q1 turns ON and OFF with a longer ON width time than the PWM control signal (Vpwm).

The ON width generation circuit 517 illustrated in FIG. 17 generates an ON width time having no relation to input voltage Vin. However, it is preferable to change the ON width time in correspondence with the input voltage Vin.

More specifically, the ON width time generated by the ON width generation circuit 517 illustrated in FIG. 17 must be at least "ts×Vout/Vin (min)." More specifically, the ON width time must be at least "ts×Vout/Vin(min)" because when the input voltage Vin is at the minimum, the ON width time of the PWM control signal reaches its maximum. In order to perform energy injection even under the conditions of Vin (min), the ON width time must be made larger than the maximum ON width time.

However, with a device having a wide input voltage Vin range, because the energy ON width time becomes too large when the input voltage Vin is at its maximum Vin (max), the current flowing to the inductor L1 at the first ON is too large, and the overshoot caused by the residual energy cannot be ignored. At this point, it is preferable to have a function whereby the post-energy injection overshoot is decreased by controlling the ON width of the energy injection time to a value just slightly larger than "ts×Vout/Vin" in response to input voltage Vin.

Figure 19:
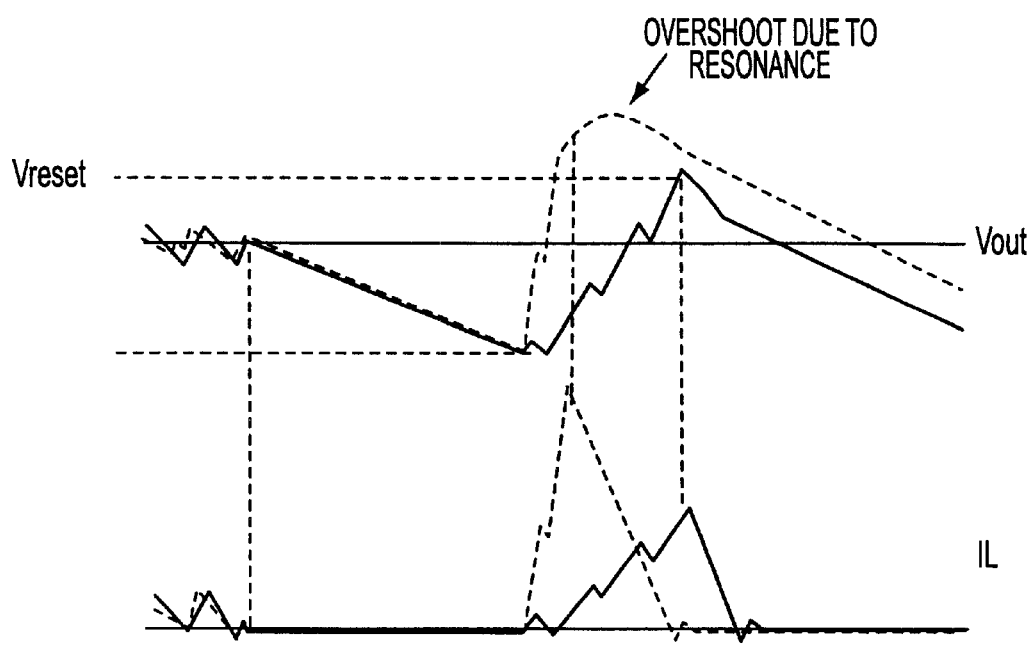
FIG. 19 is a graph used to explain overshoot as a result of resonance in accordance with embodiments of the present invention.

FIG. 19 is a graph illustrating overshoot as a result of resonance in accordance with embodiments of the present invention. As shown in FIG. 19, without the function of controlling the ON width of the energy injection time, overshoot occurs. The solid line in FIG. 19 is the overshoot at Vin(min) and the broken line is the overshoot at Vin(max). As shown in FIG. 19, when the inductor current is large, the residual energy causes resonance with capacitor C1, and the output voltage Vout builds up with a frequency of "$1/2/\pi (L \times C1)^{1/2}$".

Figure 20:
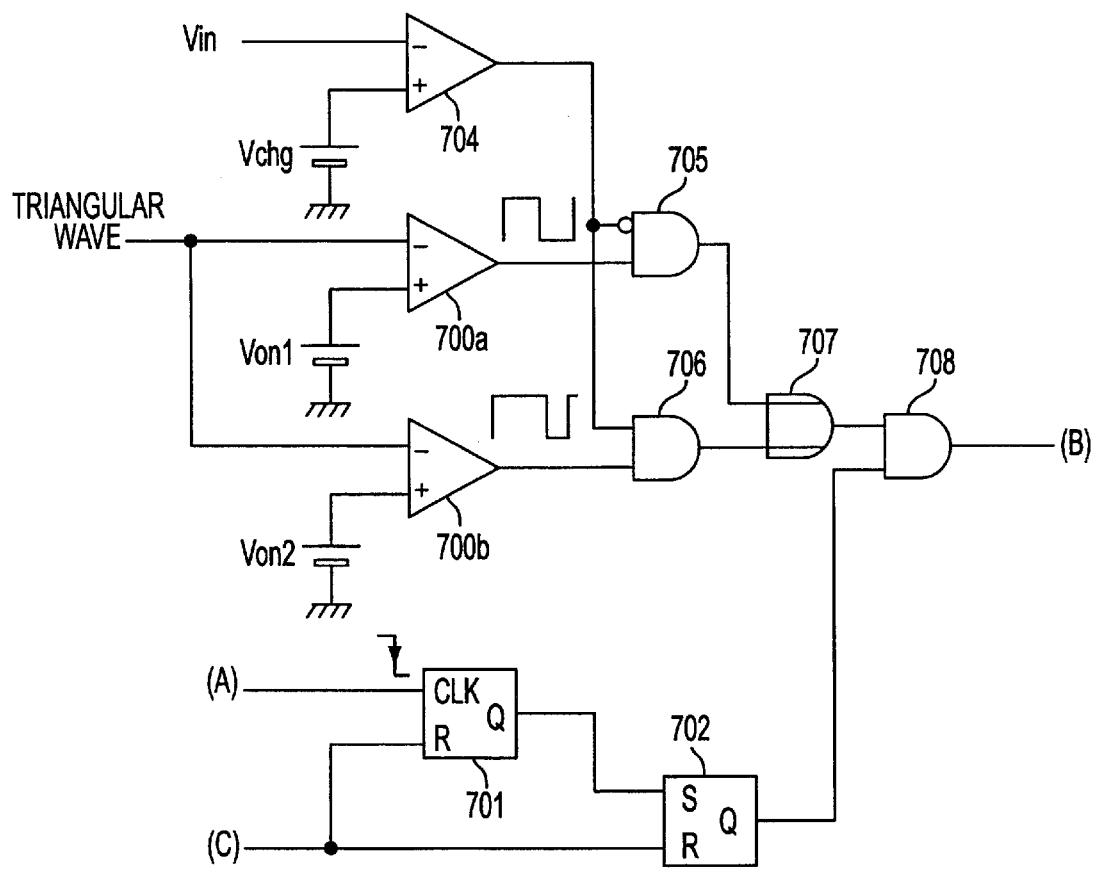
FIG. 20 is a diagram of an ON width generation circuit in accordance with embodiments of the present invention.

FIG. 20 is a circuit diagram of the ON width generation circuit 517 to change the ON width time in correspondence to the input voltage Vin, corresponding to the embodiment illustrated in FIG. 17, in accordance with embodiments of the present invention.

The ON width generation circuit 517 shown in FIG. 20 comprises a comparator 700a, which is the same type of comparator as the comparator circuit 700 provided in the embodiment illustrated in FIG. 17, and which generates a control signal having an ON width time larger than the PWM control signal; a comparator 700b, which is also the same type of comparator as the comparator circuit 700 provided in the embodiment illustrated in FIG. 17, and which generates a control signal having an ON width time larger than the comparator 700a; a level detection comparator 704 to output a high level when the input voltage Vin is smaller than a reference voltage Vchg, and to output a low level when the input voltage Vin is larger than the reference voltage Vchg; an AND circuit 705 to pass the control signal generated by the comparator 700b (the ON width time is small) when the level detection comparator 704 outputs a low level; an AND circuit 706 to pass the control signal generated by the comparator 700b (the ON width time is large) when the level detection comparator 704 outputs a high level; an OR circuit 707 to calculate and output the logical sum of the output signal of the AND circuit 705 and the output signal of the AND circuit 706; and an AND circuit 708 to calculate and output the logical product of the output signal of the OR circuit 707 and the output signal of the latch circuit 702.

In accordance with the ON width generation circuit 517 shown in FIG. 20, the proper energy injection can be performed when the power saving mode is cancelled. During the performance of the energy injection using a control signal having an ON width time larger than the PWM control signal, if the input voltage Vin is small, a large ON width time control signal is generated such that a large amount of energy is injected; however, if the input voltage Vin is large, a small ON width time control signal is generated such that the injection of energy does not become excessive.

In accordance with the embodiment of the invention shown in FIG. 20, the reference voltage Von1 input at the positive input terminal of the comparator 700$a$ and the reference voltage Von2 input at the positive input terminal of the comparator 700$b$ have the following relationship:

Von1<Von2, Vin(min)<Vchg

Von1>Vramp×Vout/Vin(chg)

Von2>Vramp×Vout/Vin(min)

In accordance with the embodiment illustrated in FIG. 20, the ON width time is modified in two steps in response to the input voltage Vin. Moreover, modifications to the embodiment shown in FIG. 20 are possible.

In accordance with the energy injection circuit shown in FIG. 16, when the power saving mode is cancelled, control is performed such that energy injection is performed by generating a control signal equivalent to the PWM control signal and having an ON width time larger than that of the PWM control signal. However, it is also possible to modify the embodiment shown in FIG. 16 such that energy is continuously injected until predetermined conditions are met.

Figure 21:
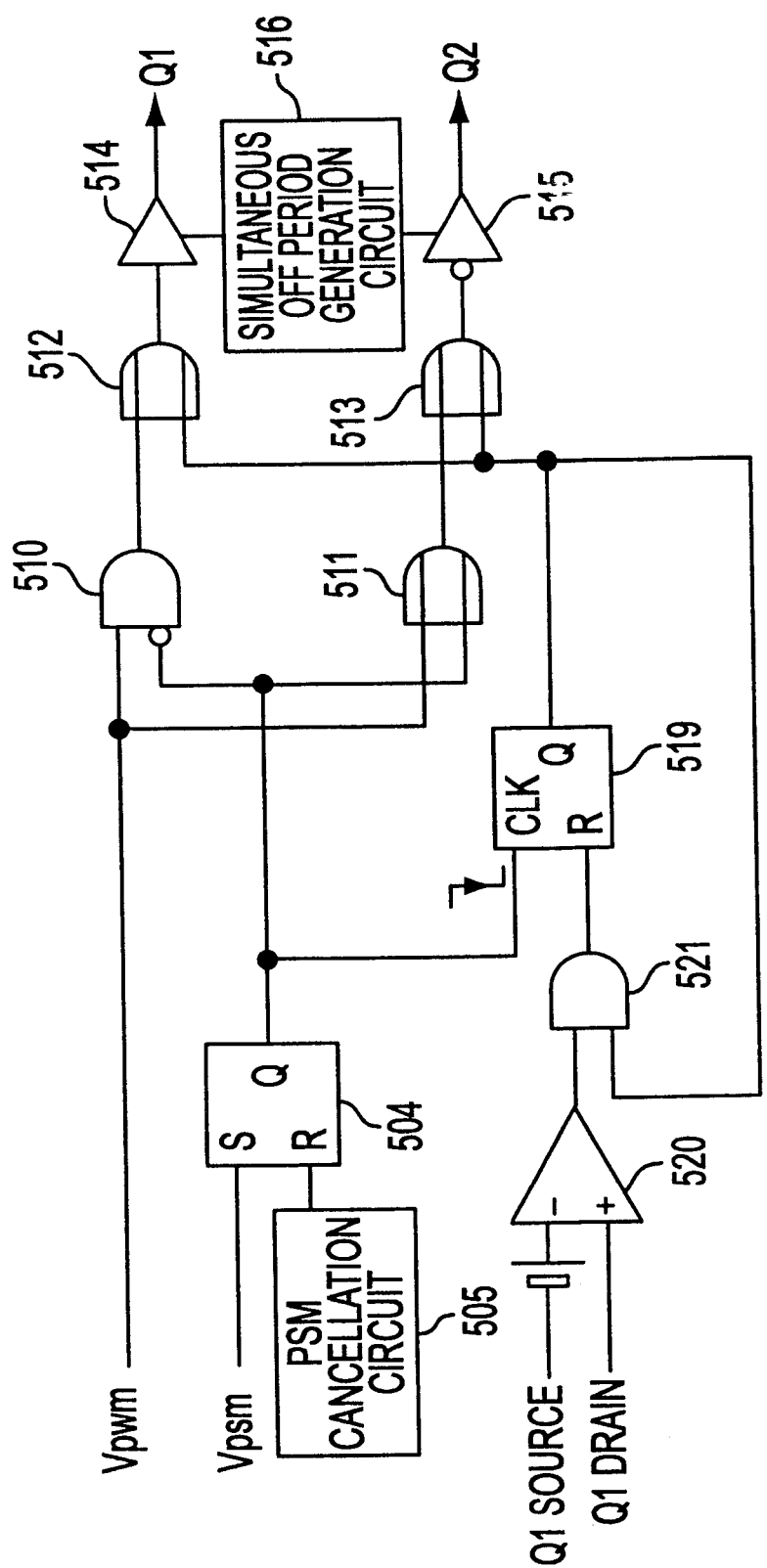
FIG. 21 is a diagram of a circuit used to perform energy injection in accordance with embodiments of the present invention.

FIG. 21 is a diagram of a circuit used to perform energy injection wherein energy is continuously injected until predetermined conditions are met in accordance with embodiments of the present invention.

As shown in FIG. 21, the control logic circuit 50 comprises, in place of the ON width generation circuit 517 and the ON width generation circuit reset circuit 518 provided in the embodiment illustrated in FIG. 16, a latch circuit 519 to latch a high level and to output to the OR circuits 512 and 513 when the PSM latch circuit 504 generates an instruction to cancel the power saving mode; a peak current comparator 520 to output a high level when the drain voltage of the main switching element Q1 becomes larger than the source voltage by a predetermined voltage amount and to output a low level when the drain voltage of the main switching element Q1 is smaller than the source voltage; and an AND circuit 521 to reset the latch circuit 519 when the latch circuit 519 latches a high level and the peak current comparator 520 outputs a high level.

In accordance with the embodiment shown in FIG. 21, when the power saving mode is cancelled, the latch circuit 519 operates to perform energy injection by keeping the main switching element Q1 ON during the time until the AND circuit 521 issues the reset instructions. The current flowing to the main switching element Q1 then becomes as large as or larger than a predetermined value because of the injection of energy, causing the drain voltage of the main switching element Q1 to become larger than the source voltage by at least a predetermined amount. Whereupon the AND circuit 521 receives the high level output of the error amp 520 and resets the latch circuit 519. The resetting of the latch circuit 519 causes the latch circuit 519 to stop the energy injection.

At this time, when the latch circuit 519 outputs a high level, i.e., during the energy injection mode, the AND circuit 521 treats the high level output of the peak current comparator 520 as effective, thus normally stopping the energy injection.

Figure 22:
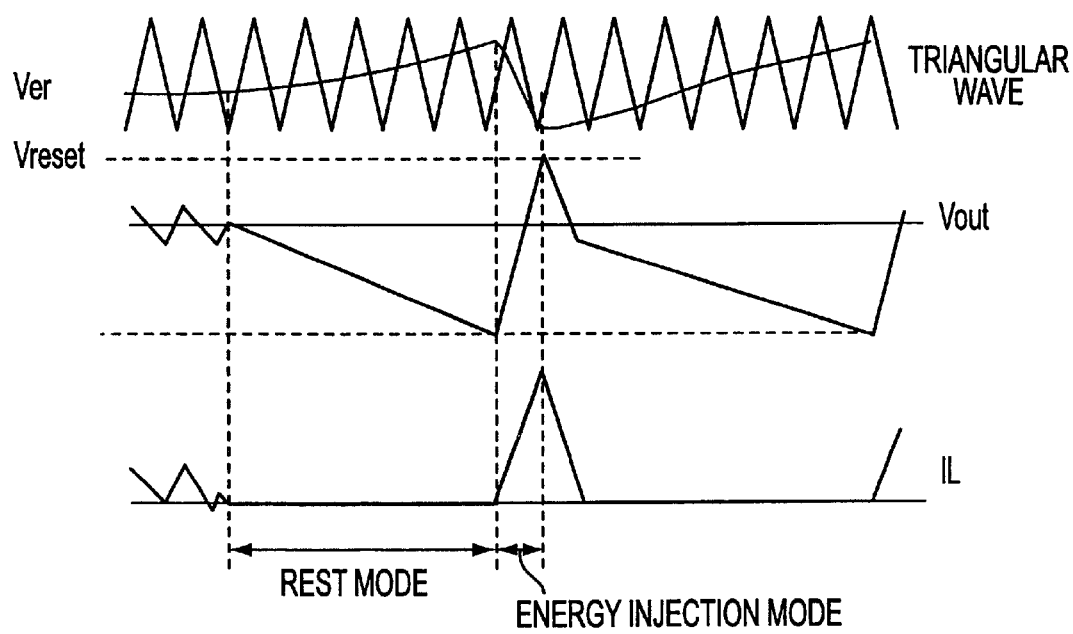
FIG. 22 is a graph explaining operation of the circuit used to perform energy injection shown in FIG. 21 in accordance with embodiments of the present invention.

FIG. 22 is a graph explaining operation energy injection circuit shown in FIG. 21 in accordance with embodiments of the present invention. As described above, in accordance with the embodiment illustrated in FIG. 21, when the power saving mode is cancelled, as shown in FIG. 22, the main switching element Q1 is kept ON during the time until the current flowing to the main switching element Q1 becomes as large as or larger than a predetermined value. This causes energy to be injected into the output capacitor C1.

At this time, according to a method to be described hereinbelow, it is possible to cause the operation of the main switching element Q1 to stop by detecting the increase in the output voltage Vout and the decrease in the output voltage Ver of the error amp 20.

The ON width generation circuit reset circuit 518 provided in the embodiment illustrated by FIG. 16 will now be described below.

The ON width generation circuit reset circuit 518 stops the energy injection by generating reset instructions to the ON width generation circuit 517 and stopping the generation of the control signal having an ON time width greater than the PWM control signal used during the energy injection.

Figure 23A:
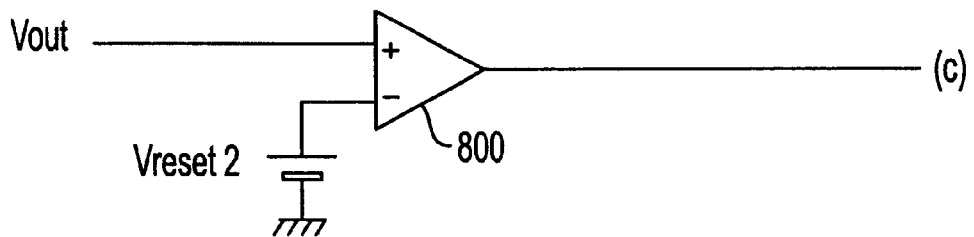
FIGS. 23A and 23B are diagrams of an ON width generation circuit reset circuit in accordance with embodiments of the present invention.
Figure 23B:
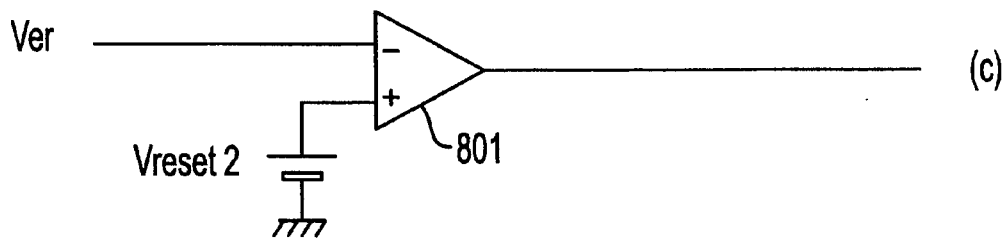
Figure 24:
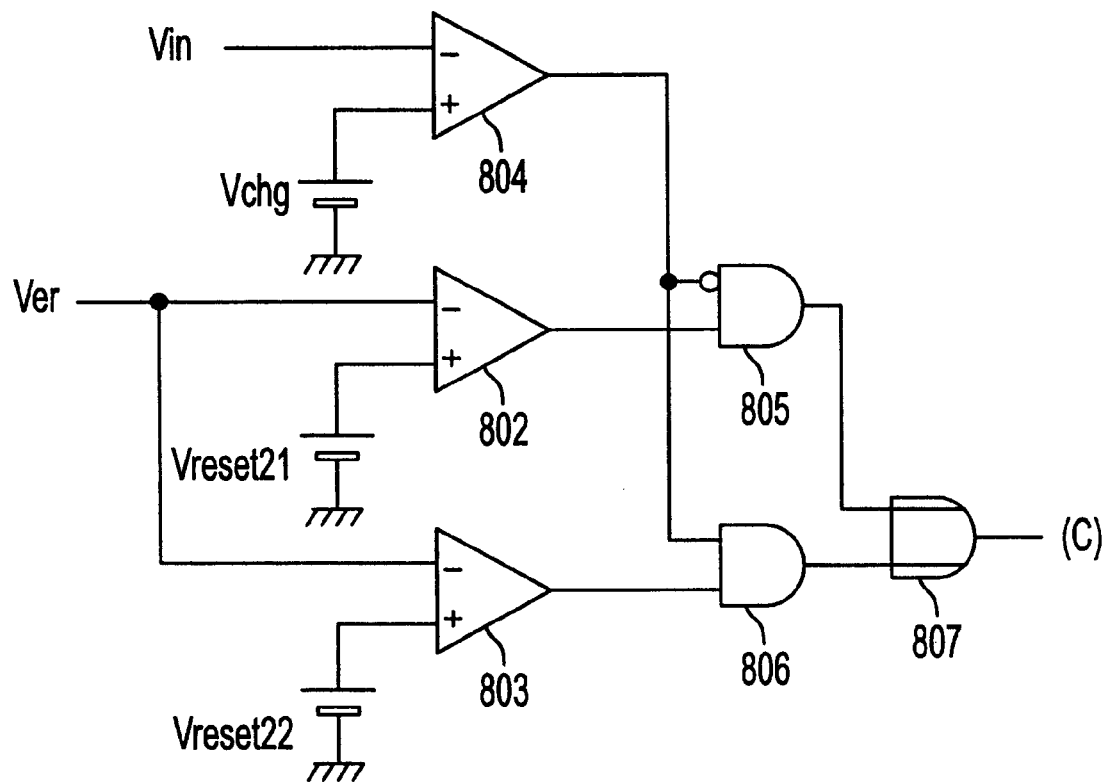
FIG. 24 is a diagram of an ON width generation circuit reset circuit in accordance with embodiments of the present invention.

FIGS. 23A, 23B and 24 illustrate embodiments of the ON width generation circuit reset circuit 518 in accordance with the present invention.

As shown in FIG. 23A, the ON width generation circuit reset circuit 518 comprises a comparator 800 to stop energy injection by issuing a reset instruction to the ON width generation circuit 517. When the energy injection is started, the output voltage Vout of the DC-to-DC converter circuit increases. The output voltage Vout is input at the positive input terminal of the comparator 800 and a reference voltage Vreset2 is input at the negative input terminal of the comparator 800. The comparator 800 outputs a high level when the output voltage Vout becomes larger than the reference voltage Vreset2.

As described hereinabove, the reference voltage Vreset2 input into the comparator 800 is a set at a value higher than the reference voltage Vreset1 input into the comparator 600 so that the comparator 600 comprising the PSM cancellation circuit shown in FIG. 9 does not output a high level at the time energy injection ends.

In accordance with the embodiment shown in FIG. 23B, the ON width generation circuit reset circuit 518 comprises a comparator 801 to stop energy injection by issuing a reset instruction to the ON width generation circuit 517. When the energy injection is started, the output voltage Ver of the error amp 20 decreases corresponding to the increase in the output voltage Vout of the DC-to-DC converter circuit. The output voltage Ver of the error amp 20 is input to the negative input terminal of the comparator 801 and a reference voltage Vreset2 is input to the positive input terminal of the comparator 801. The comparator 801 outputs a high level when the output voltage Ver becomes smaller than the reference voltage Vreset2.

As described hereinabove, the reference voltage Vreset2 input into the comparator 801 is set at a value higher than the reference voltage Vreset1 input into the comparator 601 so that the comparator 601 comprising the PWM cancellation circuit shown in FIG. 9 does not output a high level at the time energy injection ends.

In accordance with the embodiment of the invention shown in FIG. 24, the ON width generation circuit reset circuit 518 operates to switch the reference voltage Vreset2 in response to the level of the input voltage Vin. As shown in FIG. 24, the ON width generation circuit reset circuit 518 comprises a comparator 802 having a negative terminal into which the output voltage Ver of the error amp 20 is input, and having a positive terminal into which a reference voltage Vreset21 is input; a comparator 803 having a negative terminal into which the output voltage Ver of the error amp 20 is input and having a positive terminal into which a reference voltage Vreset22 (Vreset21<Vreset 22) is input; a level detection comparator 804 to output a high level when the input voltage Vin is smaller than the reference voltage Vchg and to output a low level when the input voltage Vin is larger than the reference voltage Vchg; an AND circuit 805 to pass the high level output by the comparator 802 when the level detection comparator 804 outputs a low level; an AND circuit 806 to pass the high level output by the comparator 803 when the level detection comparator 704 outputs a high level; and an OR circuit 807 to calculate and output the logical sum of the output voltage of the AND circuit 805 and the output voltage of the AND circuit 806. Using the reference voltages Vreset21 and Vreset22, which have taken into account the size of the input voltage Vin, reset instructions are generated to the ON width generation circuit 517.

In accordance with the embodiment illustrated in FIG. 24, the ON width generation circuit reset circuit 518 operates such that the fall in the output voltage Ver of the error amp 20 is detected and a reset instruction is sent to the ON width generation circuit 517. As can be seen from the equation "Ver=Vramp×Vout/Vin," when the input voltage Vin is large, the output voltage Ver of the error amp 20 becomes small. Thus, a small reference voltage Vreset21 is used for the reference voltage used to determine when to stop the energy injection. On the other hand, when the input voltage Vin is small, a large reference voltage Vreset22 is used for the reference voltage used to determine when to stop energy injection. In the above-described manner, the ON width generation circuit reset circuit 518 appropriately determines the fall of the output voltage Ver of the error amp 20.

As described hereinabove, in accordance with the embodiment illustrated in FIG. 16, the energy injection processing executed by the ON width generation circuit 517 is stopped in response to the output signal of the ON width generation circuit reset circuit 518.

Figure 25:
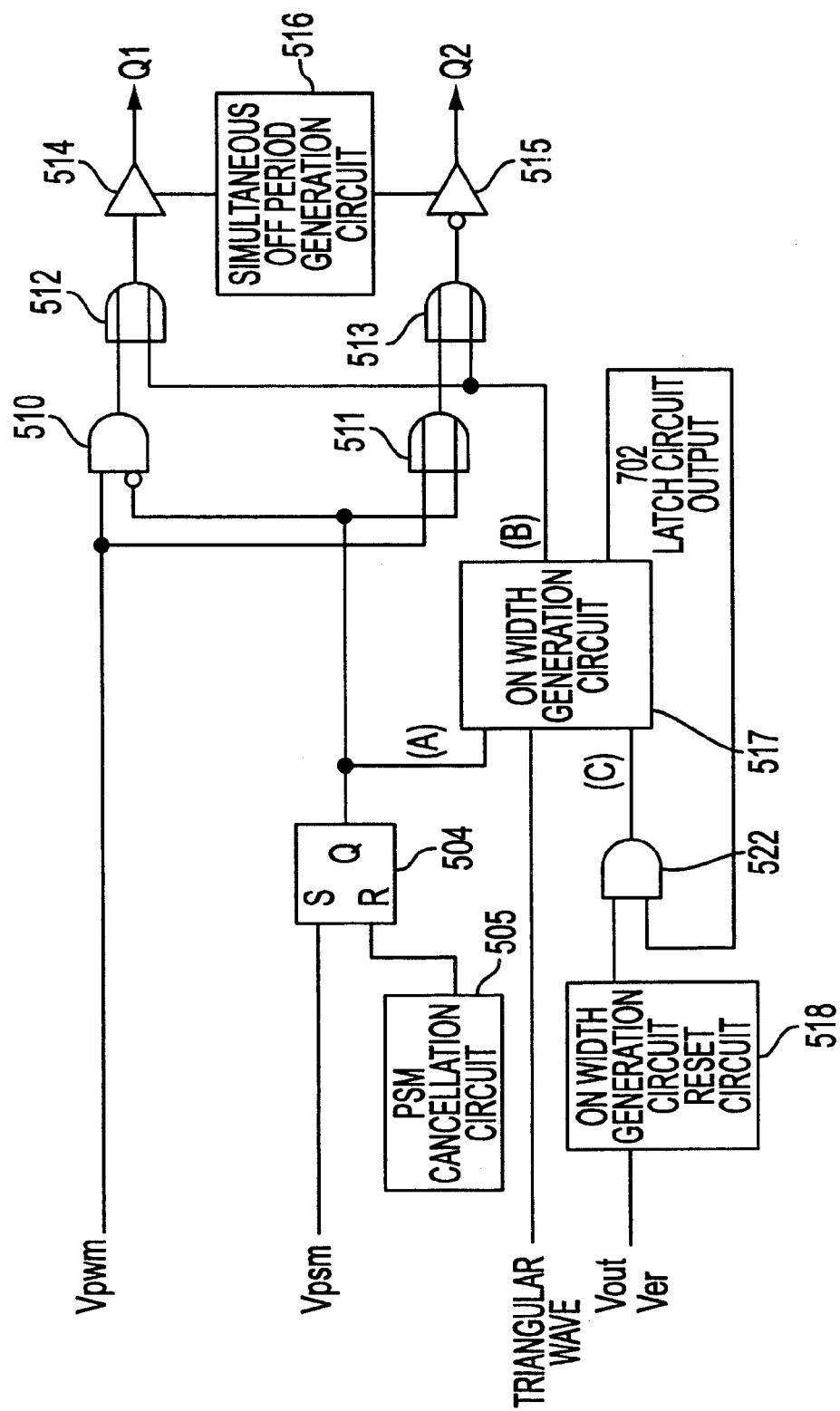
FIG. 25 is a diagram of a circuit for performing energy injection in accordance with embodiments of the present invention.

FIG. 25 is a diagram of a circuit for performing energy injection in accordance with Gus embodiments of the present invention. As shown in FIG. 25, it is preferable to provide an AND circuit 522 to calculate the logical product of the output signal of the ON width generation circuit reset circuit 518 and the output signal of the latch circuit 702 illustrated in FIG. 17 that comprises the ON width generation circuit 517 (outputs a high level during the energy injection mode), and which outputs a reset instruction to the ON width generation circuit 517.

In accordance with the embodiment shown in FIG. 25, malfunctions occurring during sudden changes in load or when the power source is turned ON are prevented because the output signal of the ON width generation circuit reset circuit 518 is effective only during the energy injection mode.

As described hereinabove, in accordance with the embodiment of the invention illustrated in FIG. 16, the time for energy injection into the output capacitor C1 is decreased by performing energy injection during an ON width time longer than the ON width time of the main switching element Q1 prescribed by the PWM output signal (Vpwm).

FIGS. 26 through 29 illustrate circuits for stopping energy injection in accordance with embodiments of the present invention.

Figure 26:
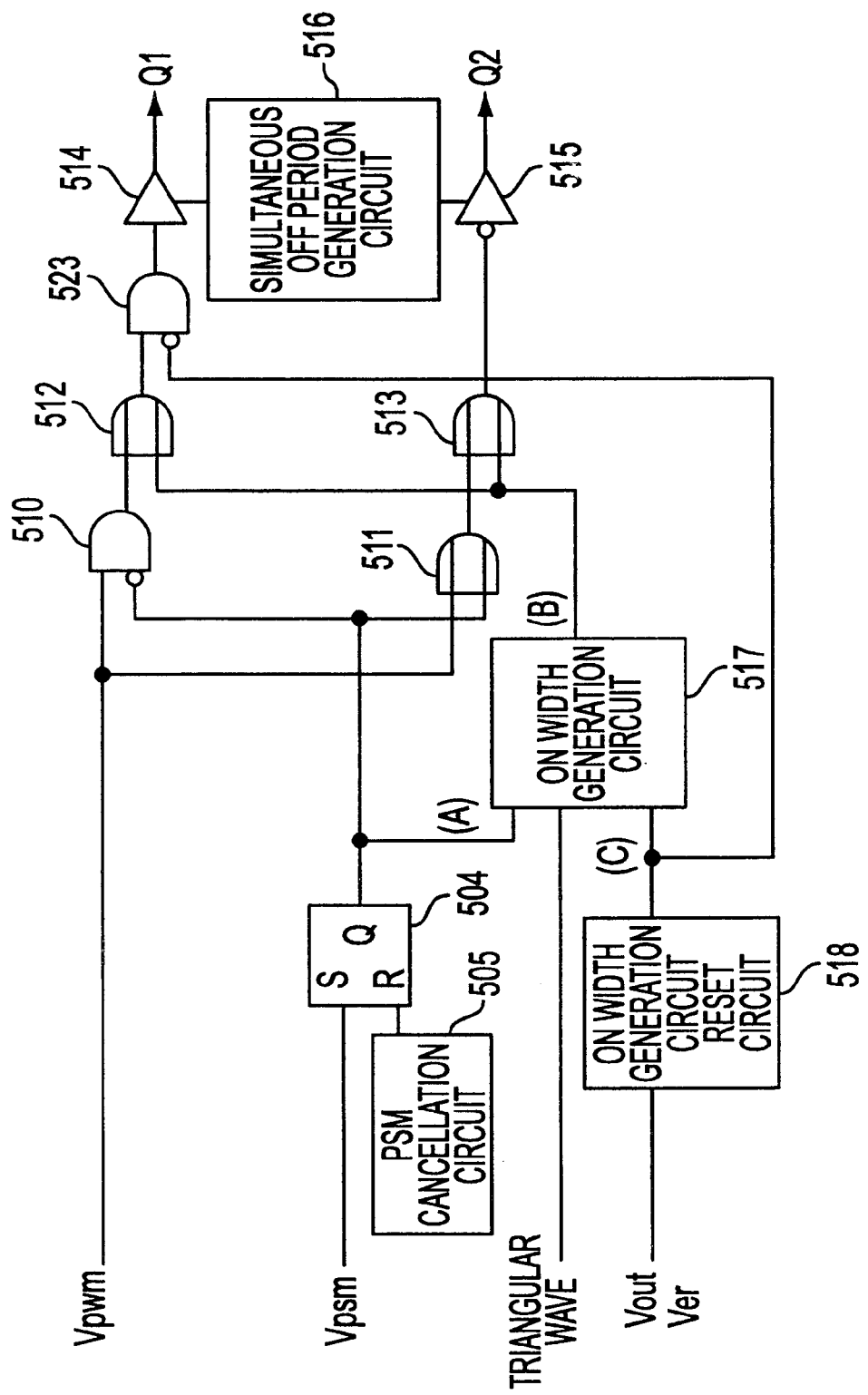
FIG. 26 is a diagram of a circuit for stopping energy injection in accordance with embodiments of the present invention.

The embodiment illustrated in FIG. 26 is similar to the embodiment illustrated in FIG. 16 and further comprises an AND circuit 523 between the OR circuit 512 and the first drive circuit 514. The AND circuit 523 calculates the logical product of the inverse value of the output signal of the ON width generation circuit reset circuit 518 and the output signal of the 512 and inputs the result to the first drive circuit 514.

In accordance with the embodiment of the invention illustrated in FIG. 26, when the ON width generation circuit reset circuit 518 generates a reset instruction to the ON width generation circuit 517 (outputs a high level), the AND circuit 523 cuts OFF the output signal of the OR circuit 512, thus causing the main switching element Q1 to turn OFF and the energy injection to stop.

Figure 27:
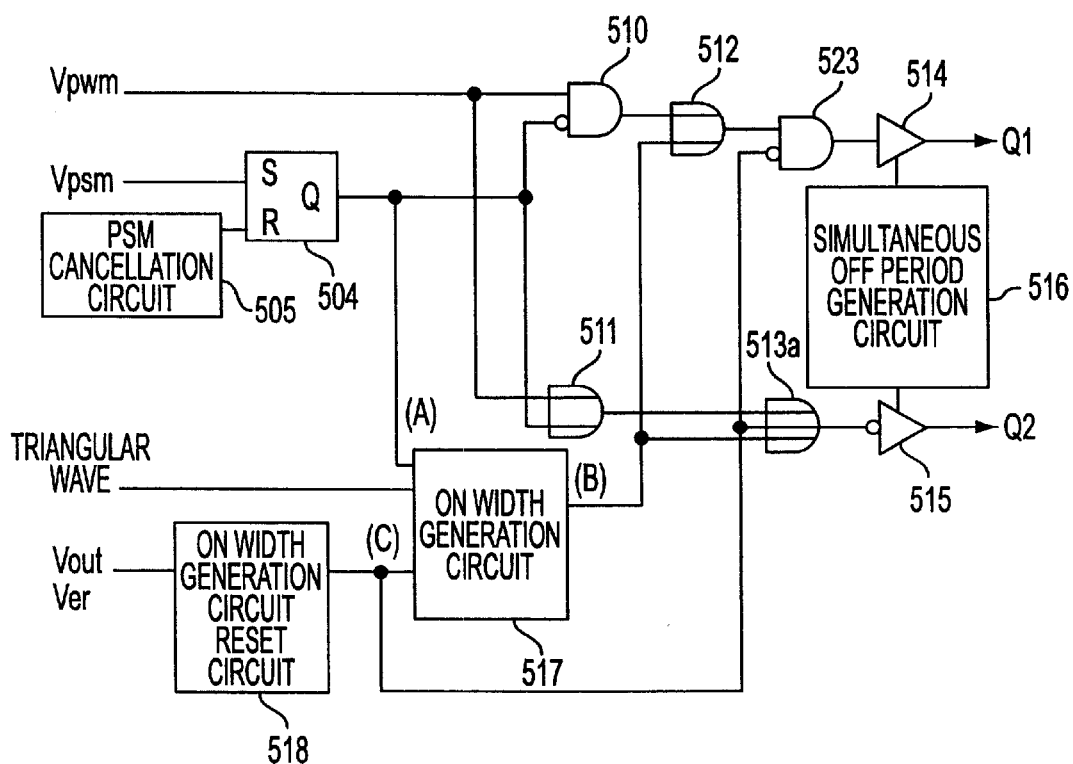
FIG. 27 is a diagram of a circuit for stopping energy injection in accordance with embodiments of the present invention.

The embodiment of the invention illustrated in FIG. 27 is similar to the embodiment illustrated in FIG. 26, and further comprises, in place of the OR circuit 513, an OR circuit 513*a* to calculate the logical sum of the output signal of the OR circuit 511 and the output signal of the ON width generation circuit 517 and the output signal of the ON width generation circuit reset circuit 518, and to output the logical sum to the second drive circuit 515.

In accordance with the embodiment of the invention illustrated in FIG. 27, when the ON width generation circuit reset circuit 518 generates a reset instruction to the ON width generation circuit 517 (outputting a high level), the AND circuit 523 cuts OFF the output signal of the OR circuit 512, thus causing the main switching element Q1 and the synchronous commutating switching element Q2 to turn OFF, having received a high level output from the OR circuit 513*a*. As a result, the energy injection is stopped.

Figure 28:
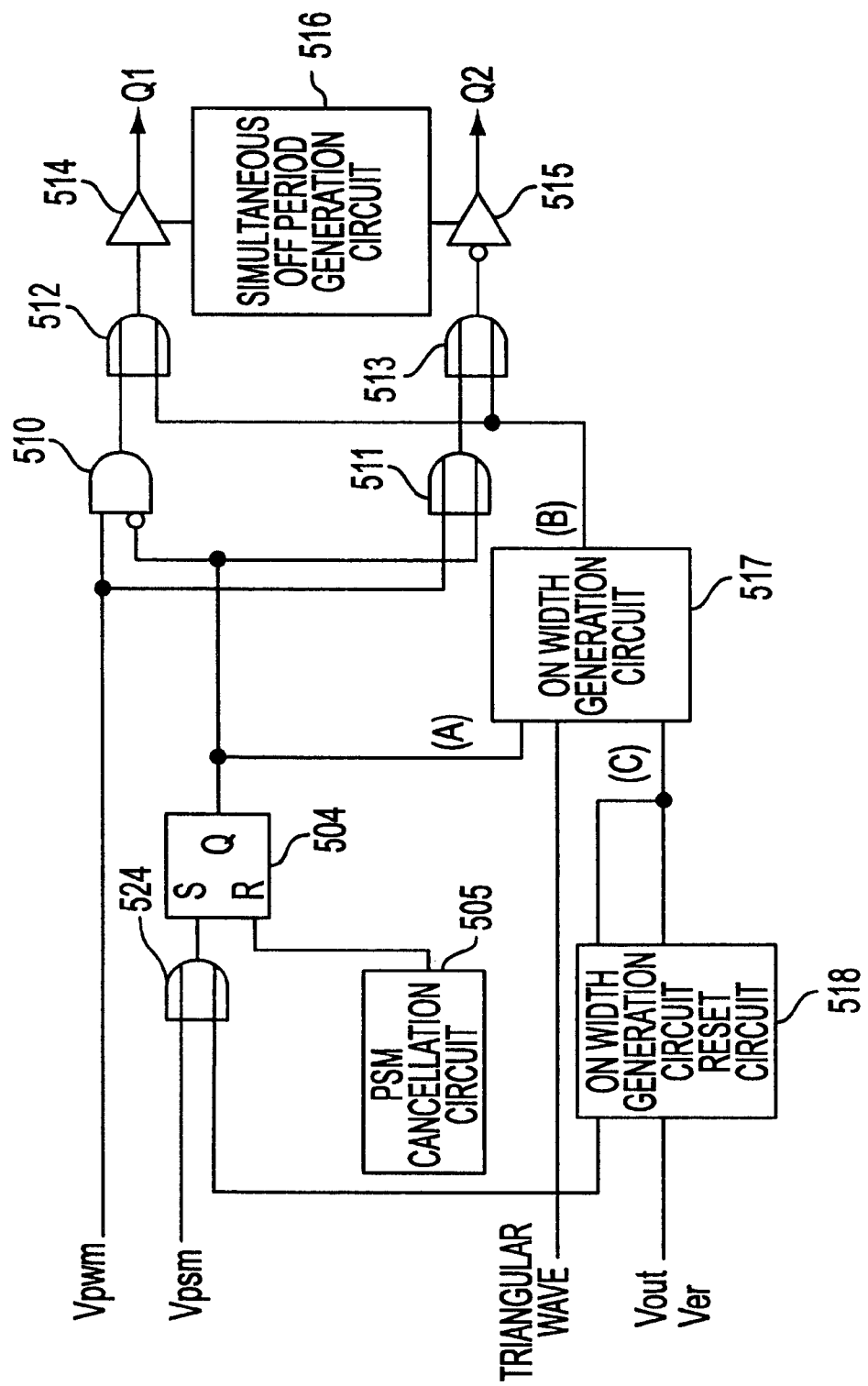
FIG. 28 is a diagram of a circuit for stopping energy injection in accordance with embodiments of the present invention.

The embodiment illustrated in FIG. 28, is similar to the embodiment illustrated in FIG. 16, and farther comprises an OR circuit 524 to calculate the logical sum of the PSM instruction signal (Vpsm) output by the PSM set comparator 40 and the output signal of the ON width generation circuit reset circuit 518, and to input the logical sum to the latch terminal of the PSM latch circuit 504.

In accordance with the embodiment illustrated in FIG. 28, when the energy injection is stopped by the ON width generation circuit reset circuit 518 issuing a reset instruction to the ON width generation circuit 517 (outputting a high level), the PSM latch circuit 504 latches a high level, causing the power saving mode to be entered. This causes the main switching element Q1 and the synchronous commutating switching element Q2 to turn OFF, thereby stopping the energy injection.

Figure 29:
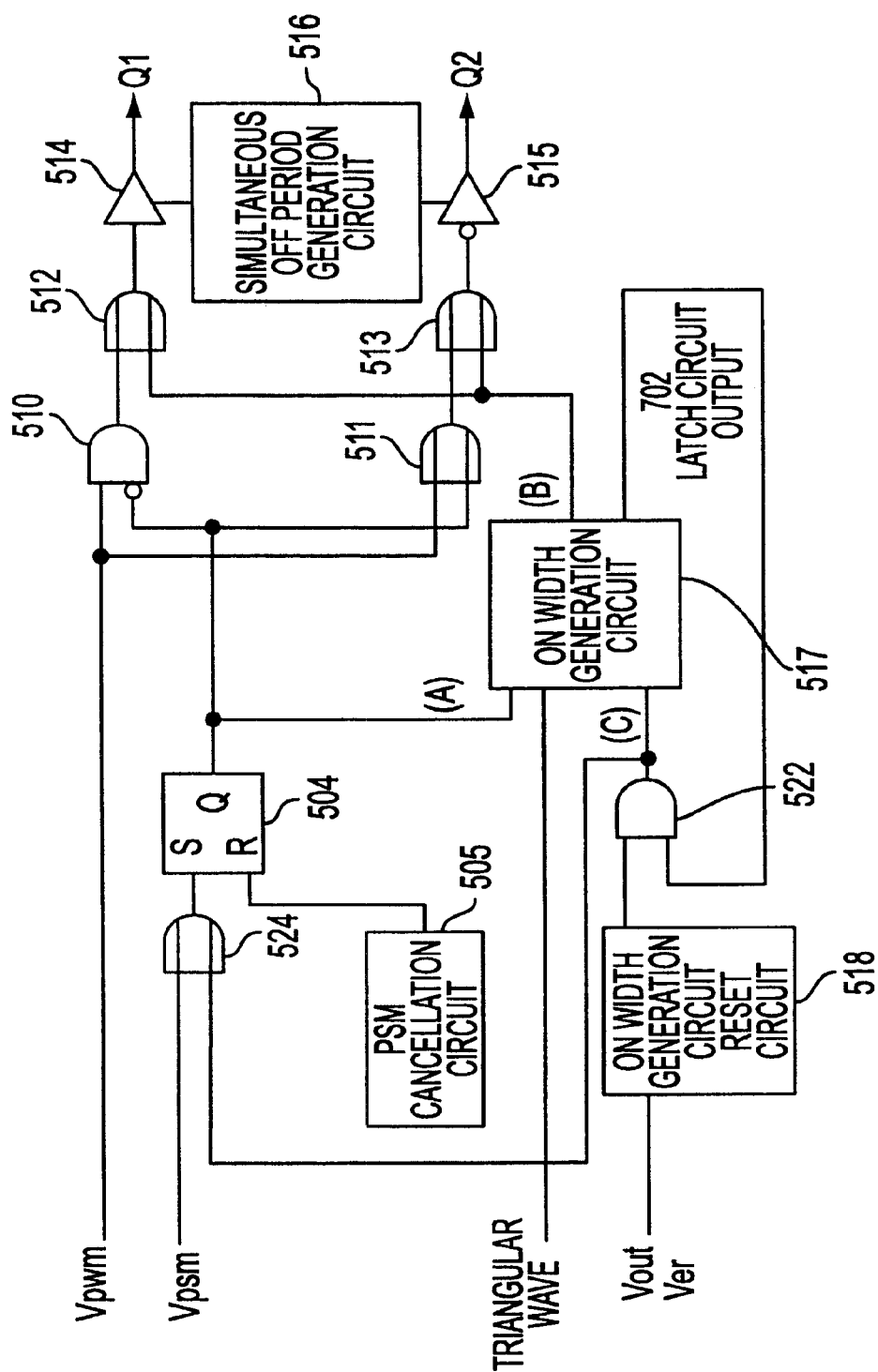
FIG. 29 is a diagram of a circuit for stopping energy injection in accordance with embodiments of the present invention.

The embodiment illustrated in FIG. 29, is similar to the embodiment illustrated in FIG. 28, and comprises the AND circuit 522 shown in the embodiment illustrated in FIG. 25. More specifically, the embodiment shown in FIG. 28 includes the AND circuit 522 to calculate the logical product of the output signal of the ON width generation circuit reset circuit 518 and the output signal of the latch circuit 702 shown in FIG. 17 that comprises the ON width generation circuit 517 (outputs a high level during the energy injection mode), and to output the logical product to the OR circuit 524 and generate reset instructions to the ON width generation circuit 517.

In accordance with the embodiment illustrated in FIG. 29, while similar to the embodiment illustrated in FIG. 28, the energy injection is stopped by turning the main switching element Q1 and the synchronous commutating switching element Q2 OFF. The embodiment shown in FIG. 29 operates such that the output signal of the ON width generation circuit reset circuit 518 is effective only during energy injection. This prevents malfunctions from occurring when the load suddenly changes or when the power source is turned on.

The present invention is not limited to the embodiments described above. For example, when power source controls other than the power source controls in accordance with the present invention are used, the inductor current may flow backwards. In accordance with this modification, in order to ensure that the power source controls of the present invention are not performed, embodiments are possible wherein the power source controls of the present invention are not performed in response to instructions from external circuits.

Figure 30:
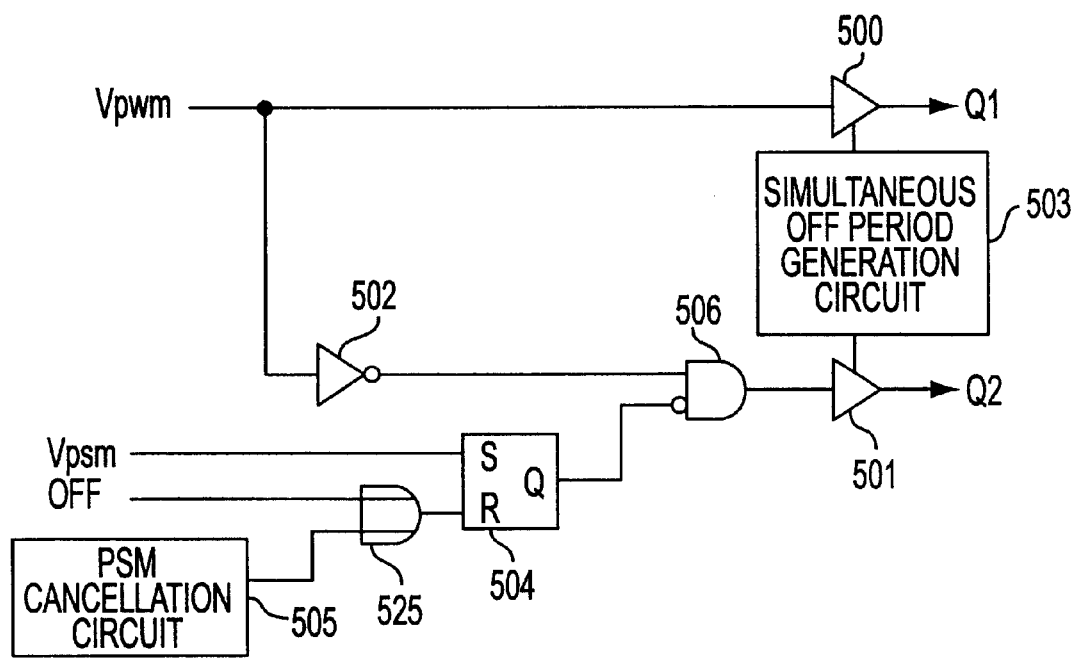
FIG. 30 is a diagram of a circuit in accordance with embodiments of the present invention.
Figure 31:
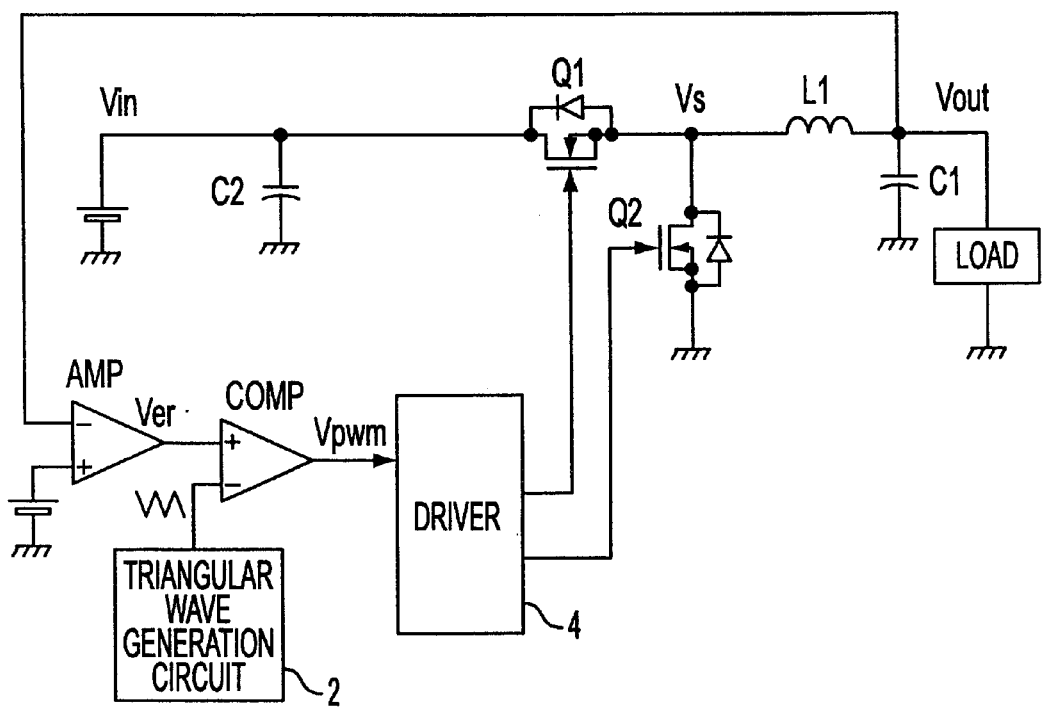
FIG. 31 is a block diagram of a conventional voltage mode control DC-to-DC converter circuit.
Figure 32:
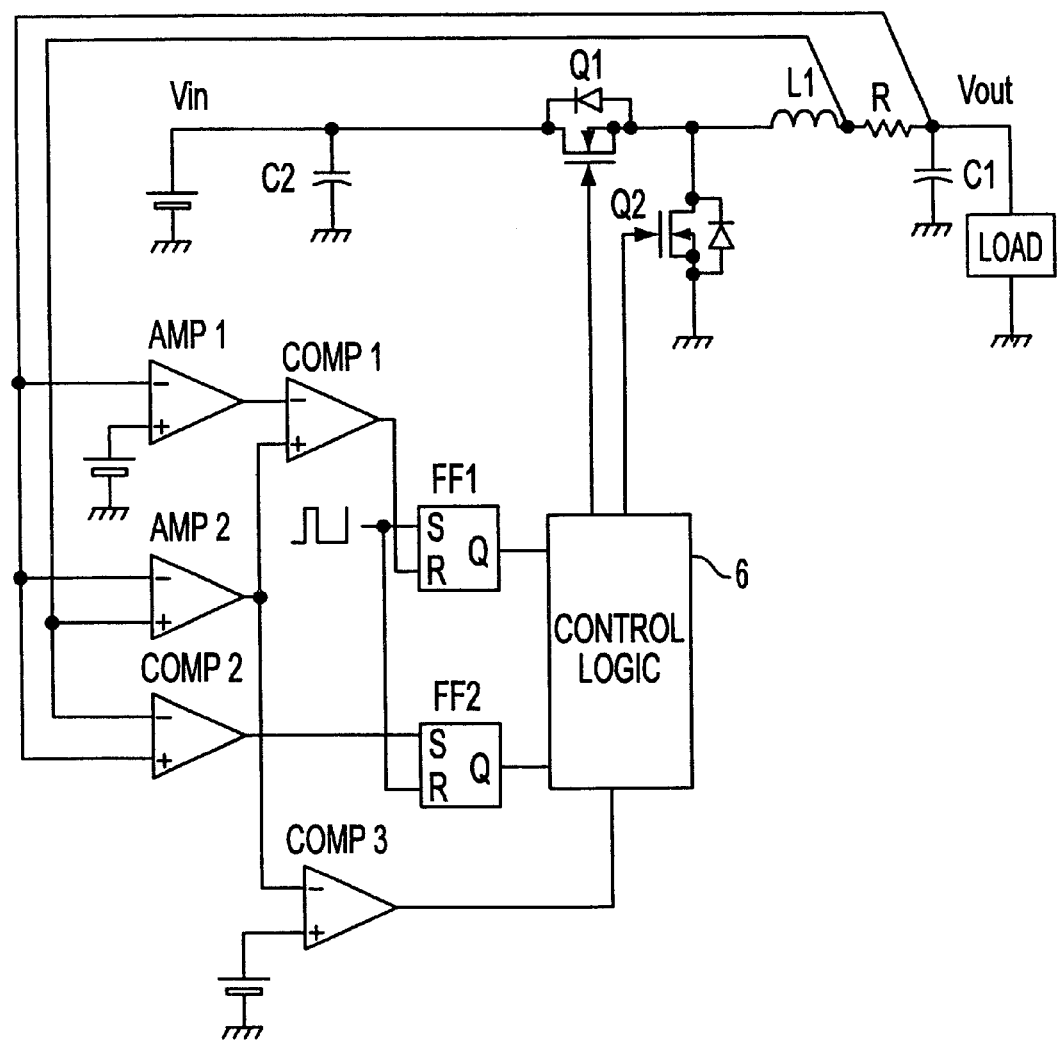
FIG. 32 is a block diagram of a conventional current mode control DC-to-DC converter circuit.

For example, similar to the embodiment illustrated in FIG. 5, as shown in FIG. 30, an OR circuit 525 is provided between the PSM latch circuit 504 and the PSM cancellation circuit 505. The OR circuit 525 calculates the logical sum of the output signal of the PSM cancellation circuit 505 and an OFF instruction signal provided by an external circuit and issues a reset instruction to the PSM latch circuit 504.

The present invention is not limited to the embodiments described hereinabove. For example, in accordance with the embodiments described hereinabove, a circuit is used wherein the output voltage Ver of the error amp 20 rises in response to a fall in the output voltage Vout. However, it is possible to provide a circuit construction wherein the output voltage Ver of the error amp 20 falls in response to a fall in the output voltage Vout.

As described hereinabove, the DC-to-DC converter circuit of the present invention detects the condition of the load current becoming smaller without using sense resistance. Further, in accordance with embodiments of the present invention, a power saving mode that lowers the drive frequency of the synchronous commutating switching element Q2 is entered when it has been detected that the load current is becoming small. Thus, the low energy consumption desired when the load current becomes small is achieved without using sense resistance, thereby making it possible to release the energy consumed by sense resistance and achieve high conversion efficiency as well as lowered cost.

Further, in accordance with the DC-to-DC converter circuit of the present invention, the conditions for canceling the power saving mode can be accurately detected.

Further, in accordance with the DC-to-DC converter circuit of the present invention, when the power saving mode is cancelled, energy, which had fallen to low levels as a result of the entry into the power saving mode, can be quickly injected. Furthermore, in accordance with embodiments of the present invention, the conditions for stopping the energy injection can be accurately detected.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A DC-to-DC converter circuit including a main switching element to turn an input voltage ON and OFF in response to an operation control signal generated based on a triangular wave signal and the output voltage of a differential amplifier, comprising:

a detection device to detect a voltage drop at the main switching element by detecting whether an output voltage of the main switching element is larger than an input voltage of the main switching element; and a control unit to enter a power saving mode to reduce a drive voltage of the main switching element in response to the detection device detecting that the output voltage of the main switching element is larger than the input voltage.

2. A DC-to-DC converter circuit, comprising:

a triangular wave generation circuit to generate a triangular wave signal;

a differential amplifier to receive the triangular wave signal and to generate an output voltage;

a main switching element to turn ON and OFF an input voltage based on an operation control signal generated in response to the triangular wave signal and the output voltage of the differential amplifier;

a synchronous commutating switching element to perform synchronous commutation of a load current and having an OFF period simultaneous with that of the main switching element, and which turns ON and OFF in a mode opposite to that of the main switching element;

a detection device to detect a voltage drop at the main switching element by detecting whether an output voltage of the main switching element is larger than an input voltage of the main switching element; and a control device to operate in a power saving mode to reduce a drive voltage of the main switching element in response to the detection device detecting that the output voltage of the main switching element is larger than the input voltage.

3. A DC-to-DC converter circuit as recited in claim 2, wherein the control device turns the synchronous commutating switching element OFF to operate in the power saving mode.

4. A DC-to-DC converter circuit as recited in claim 2, wherein control device turns the synchronous commutating switching element and the main switching element OFF to operate in the power saving mode.

5. A DC-to-DC converter circuit as recited in claim 2, wherein control device lowers an oscillating frequency of the triangular wave signal to operate in the power saving mode.

6. A DC-to-DC converter circuit as recited in claim 2, wherein the control device lowers an oscillating frequency of the triangular wave signal and turns the synchronous commutating switching element OFF to operate in the power saving mode.

7. A DC-to-DC converter circuit as recited in claim 4, further comprising:

a detection device to detect whether the output voltage is smaller than a predetermined value; and a cancellation device to cancel the power saving mode in response to the detection device detecting that the output voltage is smaller than the predetermined value.

8. A DC-to-DC converter circuit as recited in claim 4, further comprising:

a detection device to detect whether the output voltage of the differential amplifier has reached a predetermined value; and a cancellation device to cancel the power saving mode in response to the detection device detecting that the output voltage of the differential amplifier has reached the predetermined value.

9. A DC-to-DC converter circuit as recited in claim 3, further comprising:

a detection device to detect whether the output voltage of the differential amplifier has reached a predetermined value; and a cancellation device to cancel the power saving mode in response to the detection device detecting that the output voltage of the differential amplifier has reached the predetermined value.

10. A DC-to-DC converter circuit as recited in claim 3, further comprising:

an output filter including an inductor;

a detection device to detect whether a peak value of current flowing to the inductor of the output filter is larger than a predetermined value; and a cancellation device to cancel the power saving mode when the detection device detects a rise in the peak value of the current flowing to the inductor.

11. A DC-to-DC converter circuit as recited in claim 7, further comprising:

a cancellation control device to turn the main switching element ON in response to the cancellation device canceling the power saving mode.

12. A DC-to-DC converter circuit as recited in claim 7, further comprising:

an output filter including a capacitor; and an injection device to inject energy into the capacitor of the output filter in response to the cancellation device canceling the power saving mode.

13. A DC-to-DC converter circuit as recited in claim 12, further comprising:

a stop device to stop the injection of energy by the injection device.

14. A DC-to-DC converter circuit as recited in claim 7, wherein the cancellation device cancels the power saving mode in response to an external circuit issuing instructions for the cancellation of the power saving mode.

15. A DC-to-DC converter circuit, comprising:

a first switching element to receive an input voltage, and to output an output voltage;

a detection device to detect a voltage drop at the main switching element by detecting whether the output voltage of the first switching element is larger than the input voltage; and a control unit to control ON/OFF switching of the first switching element to reduce power consumption in response to the detection device detecting that the output voltage is larger than the input voltage.

16. A DC-to-DC converter circuit as recited in claim 15, wherein the control unit controls the first switching element to reduce a drive frequency of the first switching element to reduce power consumption.

17. A DC-to-DC converter circuit as recited in claim 15, further comprising a second switching element to regulate a load current, wherein the control unit controls the second switching element to reduce the drive frequency of the second switching element to reduce power consumption.

18. A DC-to-DC converter circuit as recited in claim 15, further comprising a second switching element to regulate a load current, wherein the control unit controls the second switching element to turn the second switching element OFF to reduce power consumption.

19. A DC-to-DC converter circuit as recited in claim 15, further comprising a second switching element to regulate a load current, wherein the control unit controls the first switching element to reduce the drive frequency of the first switching element, and controls the second switching element to turn the second switching element OFF to reduce power consumption.

20. A DC-to-DC converter circuit as recited in claim 15, further comprising a second switching element to regulate a load current, wherein the control unit controls the first and second switching elements to turn both the first and second switching elements OFF to reduce power consumption.

21. A DC-to-DC converter circuit, comprising:

a triangular wave generation circuit to generate a triangular wave signal;

a differential amplifier to receive the triangular wave signal and to generate an output voltage;

a main switching element to turn ON and OFF an input voltage based on an operation control signal generated in response to the triangular wave signal and the output voltage of the differential amplifier;

a synchronous commutating switching element to perform synchronous commutation of a load current and having an OFF period simultaneous with that of the main switching element, and which turns ON and OFF in a mode opposite to that of the main switching element;

a detection device to detect whether an output voltage of the main switching element is larger than an input voltage of the main switching element;

a control device to operate in a power saving mode to reduce a drive voltage of the main switching element in response to the detection device detecting that the output voltage of the main switching element is larger than the input voltage, the control device turning the synchronous commutating switching element OFF to operate in the power saving mode;

an output filter including an inductor;

a detection device to detect whether a peak value of current flowing to the inductor of the output filter is larger than a predetermined value; and a cancellation device to cancel the power saving mode when the detection device detects a rise in the peak value of the current flowing to the inductor.

22. A DC-to-DC converter circuit, comprising:

a triangular wave generation circuit to generate a triangular wave signal;

a differential amplifier to receive the triangular wave signal and to generate an output voltage;

a main switching element to turn ON and OFF an input voltage based on an operation control signal generated in response to the triangular wave signal and the output voltage of the differential amplifier;

a synchronous commutating switching element to perform synchronous commutation of a load current and having an OFF period simultaneous with that of the main switching element, and which turns ON and OFF in a mode opposite to that of the main switching element;

a detection device to detect whether an output voltage of the main switching element is larger than an input voltage of the main switching element;

a control device to operate in a power saving mode to reduce a drive voltage of the main switching element in response to the detection device detecting that the output voltage of the main switching element is larger than the input voltage, the control device turning the synchronous commutating switching element and the main switching element OFF to operate in the power saving mode;

a detection device to detect whether the output voltage is smaller than a predetermined value;

a cancellation device to cancel the power saving mode in response to the detection device detecting that the output voltage is smaller than the predetermined value;

an output filter including a capacitor; and an injection device to inject energy into the capacitor of the output filter in response to the cancellation device canceling the power saving mode.

23. A DC-to-DC converter circuit as recited in claim 22, further comprising:

a stop device to stop the injection of energy by the injection device.

* * * * *

UNITED STATES PATENT AND TRADEMARK OFFICE
CERTIFICATE OF CORRECTION

PATENT NO.    : 6,420,858 B1  Page 1 of 1
DATED         : July 16, 2002
INVENTOR(S)   : Seiya Kitagawa et al.

It is certified that error appears in the above-identified patent and that said Letters Patent is hereby corrected as shown below:

Column 25,
Lines 8-21, delete claim 10 in its entirety.
Lines 22-31, delete claims 12 and 13 in their entirety.

Signed and Sealed this

Twelfth Day of November, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

| | | |
|---|---|---|
| PATENT NO. | : 6,420,858 B1 | Page 1 of 1 |
| APPLICATION NO. | : 09/466133 | |
| DATED | : July 16, 2002 | |
| INVENTOR(S) | : Kitagawa et al. | |

It is certified that error appears in the above-identified patent and that said Letters Patent is hereby corrected as shown below:

In the Claim

In Column 25, Line 39, In Claim 15, delete "main" and insert -- first --, therefor.

Signed and Sealed this
Twentieth Day of May, 2014

Michelle K. Lee
*Deputy Director of the United States Patent and Trademark Office*